US011991527B2

(12) United States Patent
Jung et al.

(10) Patent No.: US 11,991,527 B2
(45) Date of Patent: May 21, 2024

(54) COMMUNICATION METHOD AND COMMUNICATION DEVICE

(71) Applicant: Samsung Electronics Co., Ltd., Suwon-si (KR)

(72) Inventors: Sooyeon Jung, Suwon-si (KR); Eunyoung Kwon, Suwon-si (KR); Mingyu Lee, Suwon-si (KR); Seongah Jeong, Suwon-si (KR); Jonghyo Lee, Suwon-si (KR); Sehee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 17/440,076

(22) PCT Filed: Mar. 23, 2020

(86) PCT No.: PCT/KR2020/003951
§ 371 (c)(1),
(2) Date: Sep. 16, 2021

(87) PCT Pub. No.: WO2020/197221
PCT Pub. Date: Oct. 1, 2020

(65) Prior Publication Data

US 2022/0191700 A1 Jun. 16, 2022

(30) Foreign Application Priority Data

Mar. 22, 2019 (KR) ........................ 10-2019-0033214

(51) Int. Cl.
*H04L 29/06* (2006.01)
*H04L 9/08* (2006.01)
(Continued)

(52) U.S. Cl.
CPC ........... *H04W 12/50* (2021.01); *H04L 9/0841* (2013.01); *H04L 9/3297* (2013.01);
(Continued)

(58) Field of Classification Search
None
See application file for complete search history.

(56) References Cited

U.S. PATENT DOCUMENTS 7,738,569 B2 6/2010 Quinn et al.
11,546,728 B2 * 1/2023 Mars .................... G06Q 20/321
(Continued)

FOREIGN PATENT DOCUMENTS

EP 3 337 119 A1 6/2018
EP 3 337 126 A1 6/2018
(Continued)

OTHER PUBLICATIONS

LAN/MAN Standards Committee of the IEEE Computer: P802.15.4z (TM) / D00 Draft Standard for Low-Rate Wireless Networks, Amendment: Enhanced Ultra Wide-Band (UWB) Physical Layers (PHYs) and Associated Ranging Techniques, IEEE Draft; P802.15.4z(TM) / D00, XP068148949, IEEE-SA, Feb. 22, 2019, Piscataway, NJ USA.
(Continued)

*Primary Examiner* — Jeffery L Williams
(74) *Attorney, Agent, or Firm* — Jefferson IP Law, LLP

(57) ABSTRACT

Provided is a method, performed by an electronic device, of communicating with another electronic device through first communication, the method including: generating a first key based on a secret key of the electronic device and a public key of the other electronic device received through second communication independent of the first communication; transmitting a public key of the electronic device to the other electronic device through the second communication such
(Continued)

that a second key corresponding to the first key is generated at the other electronic device; generating a timestamp sequence based on the first key; and conducting communication with the other electronic device through the first communication by using the timestamp sequence.

11 Claims, 15 Drawing Sheets

(51) Int. Cl.

| | |
|---|---|
| ***H04L 9/32*** | (2006.01) |
| ***H04W 12/041*** | (2021.01) |
| ***H04W 12/0471*** | (2021.01) |
| ***H04W 12/10*** | (2021.01) |
| ***H04W 12/50*** | (2021.01) |

(52) U.S. Cl.

CPC ..... *H04W 12/041* (2021.01); *H04W 12/0471* (2021.01); *H04W 12/10* (2013.01)

(56) References Cited

U.S. PATENT DOCUMENTS

| | | | | |
|---|---|---|---|---|
| 2006/0062393 | A1* | 3/2006 | Hsu | H04L 9/0891 380/281 |
| 2007/0242729 | A1* | 10/2007 | Quinn | H04L 69/24 375/130 |
| 2014/0079217 | A1 | 3/2014 | Bai et al. | |
| 2016/0302074 | A1* | 10/2016 | Hekstra | H04K 1/00 |
| 2016/0352605 | A1* | 12/2016 | O'Donoghue | H04L 9/0838 |
| 2019/0013937 | A1* | 1/2019 | Leong | H04L 9/0861 |
| 2019/0135229 | A1* | 5/2019 | Ledvina | H04W 12/06 |
| 2020/0052905 | A1* | 2/2020 | Mathias | H04L 9/006 |
| 2020/0228331 | A1* | 7/2020 | de Perthuis | H04L 9/0872 |
| 2021/0058252 | A1* | 2/2021 | Jung | H04L 9/3263 |
| 2022/0078029 | A1* | 3/2022 | Galdo | H04L 9/3265 |

FOREIGN PATENT DOCUMENTS

| | | | | |
|---|---|---|---|---|
| EP | 3 425 867 | A1 | 1/2019 | |
| KR | 10-1993-0005398 | A | 3/1993 | |
| KR | 10-2008-0051947 | A | 6/2008 | |
| KR | 10-2013-0077171 | A | 7/2013 | |
| KR | 10-1531662 | B1 | 6/2015 | |
| WO | WO-2018160863 | A1 * | 9/2018 | H04L 63/0823 |

OTHER PUBLICATIONS

European Search Report dated Apr. 7, 2022, issued in European Application No. 20779627.7.

International Search Report dated Jul. 1, 2020, issued in International Application No. PCT/KR2020/003951.

* cited by examiner

COMMUNICATION METHOD AND COMMUNICATION DEVICE

TECHNICAL FIELD

The disclosure relates to a communication method and a communication device, and more particularly, to a communication method and a communication device for securely generating and managing a security key.

BACKGROUND ART

The Internet is evolving from a human-centered network in which humans create and consume information to an Internet of Things (IoT) network in which information is transmitted and received among distributed components such as objects. Internet of Everything (IoE) technology, in which big data processing technology through connection with cloud servers and the like is combined with IoT technology, is also emerging. In order to implement IoT, technical elements such as sensing technology, wired/wireless communication and network infrastructure, service interface technology, and security technology are required. Recently, technologies such as a sensor network, machine to machine (M2M), and machine type communication (MTC) for connecting objects are being studied. In the IoT environment, intelligent information technology (IT) services that create new values in human life by collecting and analyzing data generated from connected objects may be provided. The IoT may be applied to fields such as smart homes, smart buildings, smart cities, smart cars or connected cars, smart grids, healthcare, smart home appliances, and advanced medical services through convergence and compounding of existing IT and various industries.

Meanwhile, as personalized electronic devices such as smart phones and tablet PCs are spreading, technologies for performing security, authentication, and the like using digitized virtual keys (i.e., digital keys) are being developed. As one of these digital key technologies, techniques for integrating digital keys into mobile devices, for example smart phones, by using wireless communication technologies such as Near Field Communication (NFC) are being developed.

By inserting a digital key into a mobile device, a user of the mobile device may open and close the door by using the digital key that replaces a physical key. In addition, as the function of the digital key is further expanded, the user of the mobile device may use the digital key for access to the device and control of the device.

While the use of digital keys may lead to significant improvements in user convenience and industrial effects, security concerns are also raised. This is because digital keys, unlike physical keys, may be vulnerable to hacking. Accordingly, there is a need for a method for securely generating and managing security keys to be used by devices.

DESCRIPTION OF EMBODIMENTS

Technical Problem

Provided are a communication method and a communication device for securely generating and managing a security key.

Solution to Problem

According to the disclosure, a method, performed by an electronic device, of communicating with another electronic device through first communication, the method includes: generating a first key based on a secret key of the electronic device and a public key of the other electronic device received through second communication independent of the first communication; transmitting a public key of the electronic device to the other electronic device through the second communication such that a second key corresponding to the first key may be generated at the other electronic device; generating a timestamp sequence based on the first key; and conducting communication with the other electronic device through the first communication by using the timestamp sequence.

MODE OF DISCLOSURE

Figure 1:
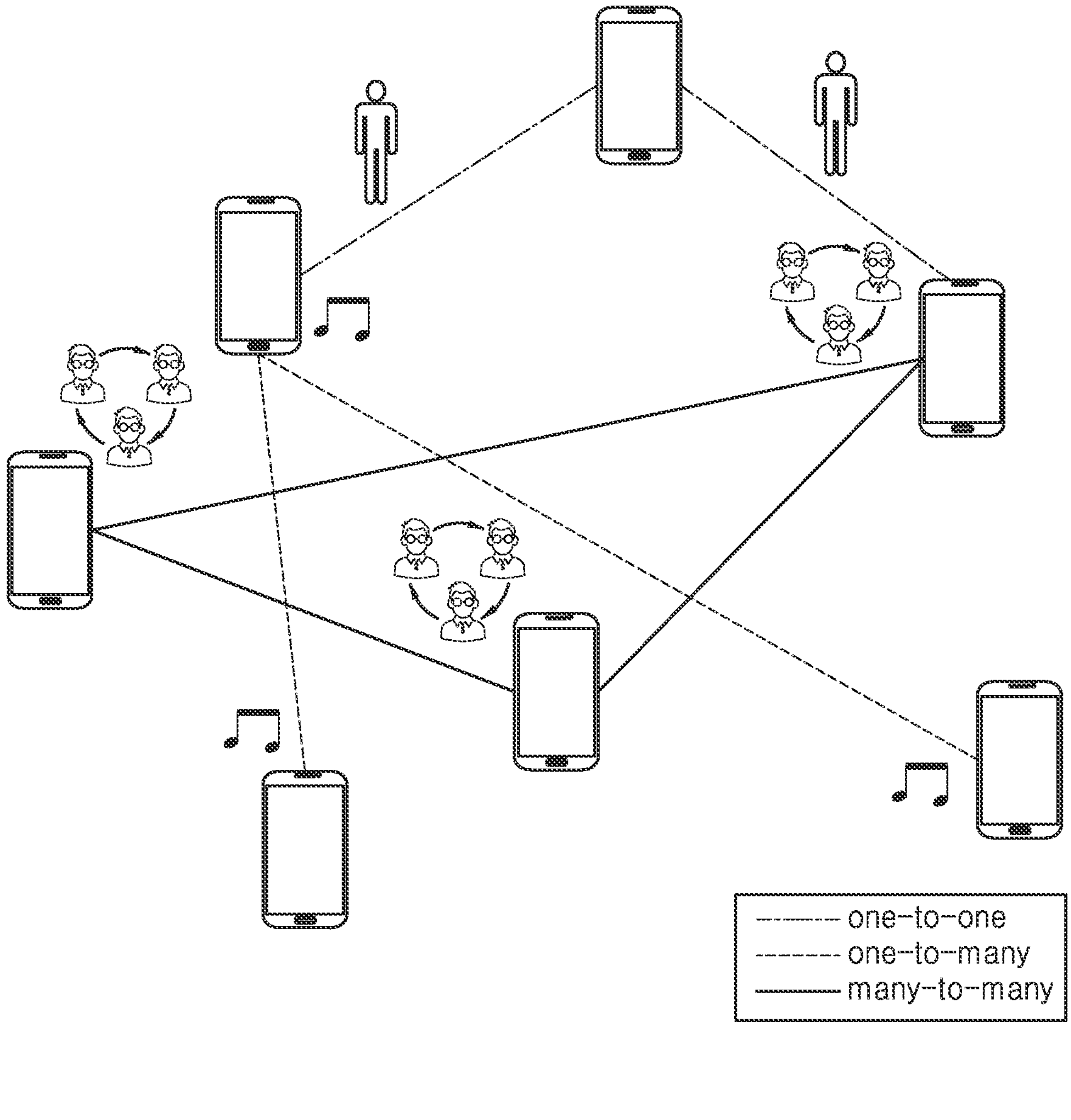
FIG. 1 is a view for explaining a general device-to-device (D2D) communication procedure.

Reference will now be made in detail to embodiments of the disclosure, examples of which are illustrated in the accompanying drawings. In this regard, the disclosure may have different forms and should not be construed as being limited to the descriptions set forth herein. In addition, descriptions of well-known functions and constructions will be omitted for clarity and conciseness, and similar reference numerals are assigned to similar elements throughout the specification.

General and widely used terms have been employed herein, in consideration of functions provided in the disclosure, and may vary according to an intention of one of ordinary skill in the art, a precedent, or emergence of new technologies. Accordingly, it will be understood that the terms used herein should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These components are only used to distinguish one component from another.

Furthermore, the terms used in the disclosure will only been used for the purpose of describing particular embodiments of the disclosure, and are not used with intent to limit the disclosure. As used herein, the singular forms “a”, “an”, and “the” are intended to include the plural forms as well, unless the context clearly indicates otherwise. Throughout the specification, it will be understood that when a unit is referred to as being “connected” to another element, it may be “directly connected” to the other element or “electrically connected” to the other element in a state in which intervening elements are present. In addition, it will be understood that when a unit is referred to as “comprising” or “including” another element, it may not exclude the other element but may further include the other element unless specifically oppositely indicates.

The use of the terms “a”, “an”, and “the” and similar referents in the context of describing the specification are to be construed to cover both the singular and the plural. Also, the steps of all methods described herein can be performed in any suitable order unless otherwise indicated herein or otherwise clearly contradicted by context. The disclosure is not limited to the described order of the steps.

Some embodiments of the disclosure may be represented by the functional block configurations and various processing steps. Some or all of these functional blocks may be implemented in hardware and/or software configuration of the various number of executing a particular function. For example, the functional blocks of the disclosure may be implemented by one or more microprocessors, or by circuit configurations for a certain function. Also, for example, the functional blocks of the disclosure may be implemented in various programming or scripting languages. Functional blocks may be realized by algorithms executed in more than one processor. In addition, the disclosure may adopt related-art technology for electronic environment set-up, signal processing, and/or data processing, etc. Terms such as “mechanism”, “factor”, “element”, “unit” and “configuration” may be widely used, and not limited to mechanical and physical formations.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

In addition, terms such as “unit”, “module”, or the like refer to units that perform at least one function or operation, and the units may be implemented as hardware or software or as a combination of hardware and software. The “unit” and “module” may be implemented by a program stored in a storage medium that may be addressed and executed by a processor. Accordingly, the “unit” and “module” may be implemented by software components, object-oriented software components, components such as class components and task components, processors, formulas, attributes, procedures, subroutines, segments of program codes, drivers, firmware, micro codes, circuits, data, database, data structures, tables, arrays, and variables.

In general, wireless sensor network technology is largely classified into wireless local area network (WLAN) technology and wireless personal area network (WPAN) technology according to a recognition distance. The WLAN technology is based on IEEE 802.11 and may allow an electronic device to access a backbone network within a radius of 100 m. The WPAN technology is based on IEEE 802.15 and may allow devices to communicate directly with each other. As the WPAN technology, Bluetooth, ZigBee, ultra-wide band (UWB) technology, and the like may be used. A wireless sensor network in which this wireless sensor network technology is implemented includes a plurality of communication electronic devices. The plurality of communication electronic devices perform communication in an active period by using a single channel That is, the communication electronic devices collect packets in real time and transmit the collected packets in an active period.

The UWB technology may refer to short-range high-speed wireless communication technology using a wide frequency band of several GHz or more, low spectral density, and short pulse width (1 nsec to 4 nsec) in a baseband state. The UWB technology may refer to a band itself to which UWB communication is applied.

In the disclosure, an electronic device may include cell phones, smart phones, mobile terminals, laptop computers, digital broadcasting terminals, personal digital assistants (PDA), portable multimedia players (PMP), navigation, slate PCs, tablet PCs, ultrabooks, telematics terminals, digital TVs, desktop computers, refrigerators, projectors, vehicles, smart cars, printers, and the like.

Hereinafter, the disclosure will be described in detail with reference to the accompanying drawings.

FIG. 1 is a view for explaining a general device-to-device (D2D) communication procedure.

D2D communication refers to a method in which geographically close electronic devices communicate directly with each other without going through an infrastructure such as a base station. The D2D communication may use unlicensed frequency bands such as Wi-Fi Direct and Bluetooth. Alternatively, the D2D communication may use licensed frequency bands to improve frequency utilization efficiency of cellular systems. The D2D communication is a term used in a limited sense to refer to inter-object communication or object intelligence communication. However, the D2D communication in the disclosure may include communication between not only simple devices equipped with a communication function, but also between various types of devices having a communication function such as a smartphone or a personal computer.

Peer aware communication (PAC) is one of D2D communication technologies and is a communication method for devices and services located in close proximity. In the PAC, a D2D electronic device may be referred to as a peer aware communication device (PD).

As shown in FIG. 1, in the PAC, there may be a one-to-one communication method in which one PD communicates with another PD, a one-to-many communication method in which one PD communicates with multiple PDs, and a many-to-many communication method in which multiple PDs communicate with multiple PDs.

Figure 2:
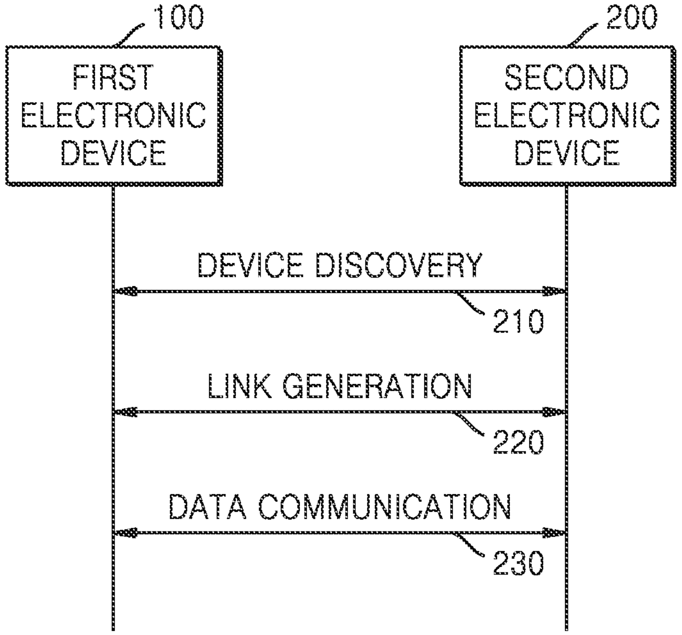
FIG. 2 is a view for explaining a communication process of a plurality of electronic devices.

FIG. 2 is a view for explaining a communication process of a plurality of electronic devices.

A first electronic device 100 and a second electronic device 200 may communicate with each other via processes of device discovery 210, link generation 220, and data communication 230.

In the device discovery 210, each of the first electronic device 100 and the second electronic device 200 may search for other electronic devices capable of D2D communication among electronic devices in the vicinity of each of the first electronic device 100 and the second electronic device 200. As a result, each of the first electronic device 100 and the second electronic device 200 may determine whether to generate a link for D2D communication. For example, the first electronic device 100 may transmit a search signal to allow the second electronic device 200 to search for the first electronic device 100. In addition, the first electronic device 100 may receive the search signal transmitted by the second electronic device 200 to verify that other electronic devices capable of D2D communication are within a D2D communication range.

In the link generation 220, each of the first electronic device 100 and the second electronic device 200 may generate a link for data transmission with an electronic device to which data is to be transmitted among the electronic devices found in the device discovery 210. For example, the first electronic device 100 may generate a link for data transmission with the second electronic device 200 found in the device discovery 210.

In the data communication 230, each of the first electronic device 100 and the second electronic device 200 may communicate data with the electronic devices wherein the links are generated in the link generation 220. For example, the first electronic device 100 may communicate data with the second electronic device 200 through the link generated in the link generation 220. Hereinafter, the first electronic device 100 may be a smartphone and the second electronic device 200 may be a vehicle.

Figure 3:
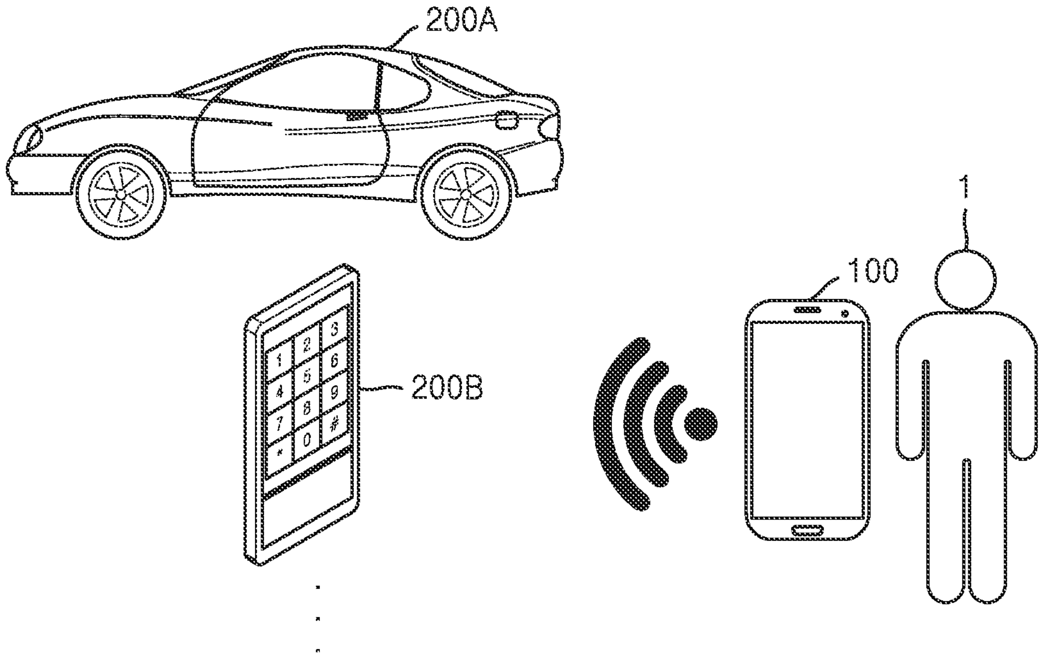
FIG. 3 is a view for explaining the use of a digital key.

FIG. 3 is a view for explaining the use of a digital key.

FIG. 3 shows second electronic devices 200A and 200B for performing access and control by using the first electronic device 100, a user 1 of the first electronic device 100, and a digital key stored in the first electronic device 100. Hereinafter, the first electronic device 100 used by the user 1 and storing the digital key may be referred to as the first electronic device 100, a digital key (DK) device 100, a source device 100, an ultra-wide band (UWB) source 100, or the like.

The first electronic device 100 may be a personalized mobile device, but is not limited thereto and may be any one of various types of electronic devices. For example, the first electronic device 100 may be a smartphone, a tablet personal computer (PC), a PC, a camera, a wearable device, or the like. The first electronic device 100 may generate, delete, manage a digital key for accessing and controlling the second electronic devices 200A and 200B, and may perform authentication on the digital key.

The second electronic devices 200A and 200B may interact with the first electronic device 100 to perform an operation for generating a digital key, and may be controlled and accessed via the digital key. The digital key may be downloaded over a network or a server.

As an example, the first electronic device 100 may store a digital key for interacting with a vehicle 200A or a device mounted in the vehicle 200A. The first electronic device 100 may control various operations of the vehicle 200A by using the stored digital key. For example, the first electronic device 100 may open or close a door of the vehicle 200A, start the vehicle 200A, or control various devices mounted on the vehicle 200A by using the digital key. Furthermore, the first electronic device 100 may control an operation related to autonomous driving, such as an automatic parking system.

As another example, the first electronic device 100 may store a digital key for interacting with a door lock 200B. The first electronic device 100 may open or close a door by using the stored digital key.

The second electronic device 200 controllable by the first electronic device 100 by using the digital key is not limited to the examples illustrated in FIG. 3, and digital key technology may be applied to various electronic devices. Hereinafter, for convenience of description, a case in which the first electronic device 100 interacts with the vehicle 200A or the device mounted on the vehicle 200A will be described as an example. That is, the first electronic device 100 may be a smartphone, and the second electronic device 200 may be a vehicle. However, the following description may also apply to a case where the first electronic device 100 interacts with various electronic devices other than the second electronic device 200 of the vehicle 200A. The first electronic device 100 may have a structure of an electronic device of FIG. 4, but is not limited thereto. The second electronic device 200 may also have the structure of the electronic device of FIG. 4, but is not limited thereto.

Figure 4:
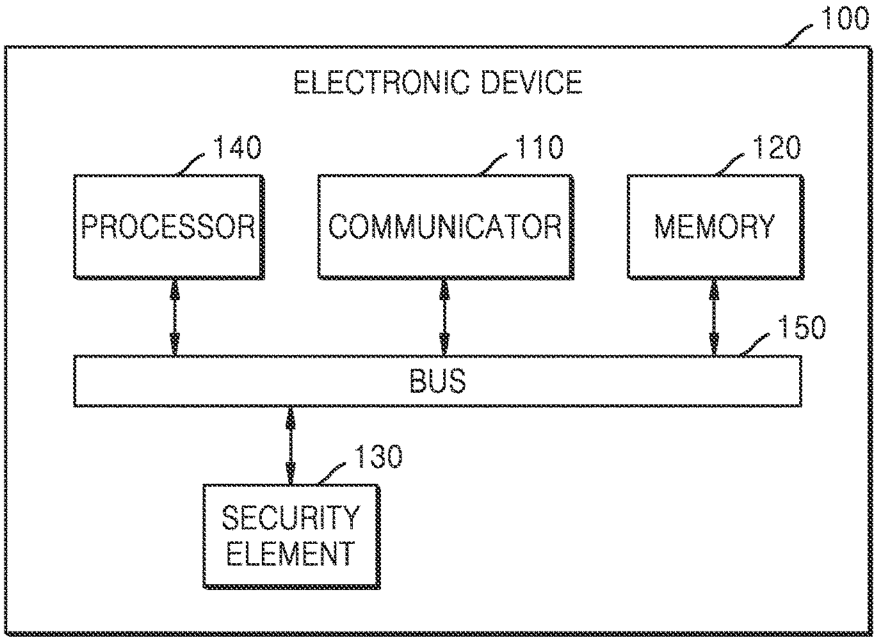
FIG. 4 is a block diagram of an electronic device according to an embodiment.

FIG. 4 is a block diagram of an electronic device according to an embodiment.

Referring to FIG. 4, the electronic device 100 may include a communicator 110, a memory 120, a security element 130, a processor 140, and a bus 150 connecting each component.

The communicator 110 may perform wired or wireless communication with another device or a network. To this end, the communicator 110 may include a communication module supporting at least one of various wired or wireless communication methods. For example, the communication module may be in the form of a chipset, or may be a sticker/barcode (e.g. a sticker including a near field communication (NFC) tag) or the like including information required for communication.

Wireless communication may include, for example, at least one of cellular communication, wireless fidelity (Wi-Fi), Wi-Fi Direct, Bluetooth, ultra-wideband (UWB), or NFC. Wired communication may include, for example, at least one of universal serial bus (USB) or high definition multimedia interface (HDMI).

In an embodiment, the communicator 110 may include a communication module for short-range communication. For example, the communicator 110 may include a communication module for performing various short-range communication such as infrared communication, magnetic secure transmission (MST), in addition to Wi-Fi, Wi-Fi Direct, Bluetooth, and NFC described above.

The memory 120 may install and store various types of data such as programs and files such as applications. The processor 140 may access and use data stored in the memory 120 or store new data in the memory 120. In an embodiment, the memory 120 may install and store a program and data for securely managing a security key.

The security element 130 is an independent secure storage device of the electronic device 100 and is a secure area that only authorized applications may access. The security element 130 may be configured to be physically isolated from other hardware configurations. In an embodiment, the security element 130 may be an embedded secure element (eSE), a universal integrated circuit card (UICC), a secure digital card (SD Card), an embedded UICC (eUICC), or the like, but is not limited thereto. The security element 130 may include a separate memory and a processor, and the processor of the security element 130 may control the overall operation of the security element 130. The processor of the security element 130 may control components included in the security element 130 to perform an operation of safely managing a security key. For example, the processor of the security element 130 may execute a program stored in the memory of the security element 130, read data stored in the memory, or store new data in the memory. Instructions or programs stored in the memory of the security element 130 may be executed by the processor of the security element 130 so that embodiments of the disclosure may be implemented. In an embodiment, programs and data for securely managing a security key may be installed and stored in the security element 130.

The processor 140 controls the overall operation of the electronic device 100 and may include at least one processor such as a central processing unit (CPU), a graphics processing unit (GPU), and the like. The processor 140 may control other components included in the electronic device 100 to perform an operation of safely managing the security key. For example, the processor 140 may execute a program stored in the memory 120 and the security element 130, read a stored file, or store a new file. Instructions stored in memory 120 may be executed by processor 140 so that embodiments of the disclosure may be implemented.

The bus 150 is a common data transmission path connecting the communicator 110, the memory 120, the security element 130, and the processor 140.

UWB secure ranging may be performed so that the electronic device 100 and another electronic device, for example, the first electronic device 100 and the second electronic device 200 communicate with each other, for example, via a UWB.

A scrambled timestamp sequence (STS) may be generated in two electronic devices, for example, the first electronic device 100 and the second electronic device 200 so that UWB secure ranging may be performed in both electronic devices 100 and 200. A method of generating the STS may proceed as disclosed in IEEE 802.15.4z regarding UWB ranging control and position estimation. The method of generating the STS will be described with further reference to FIG. 5.

Figure 5:
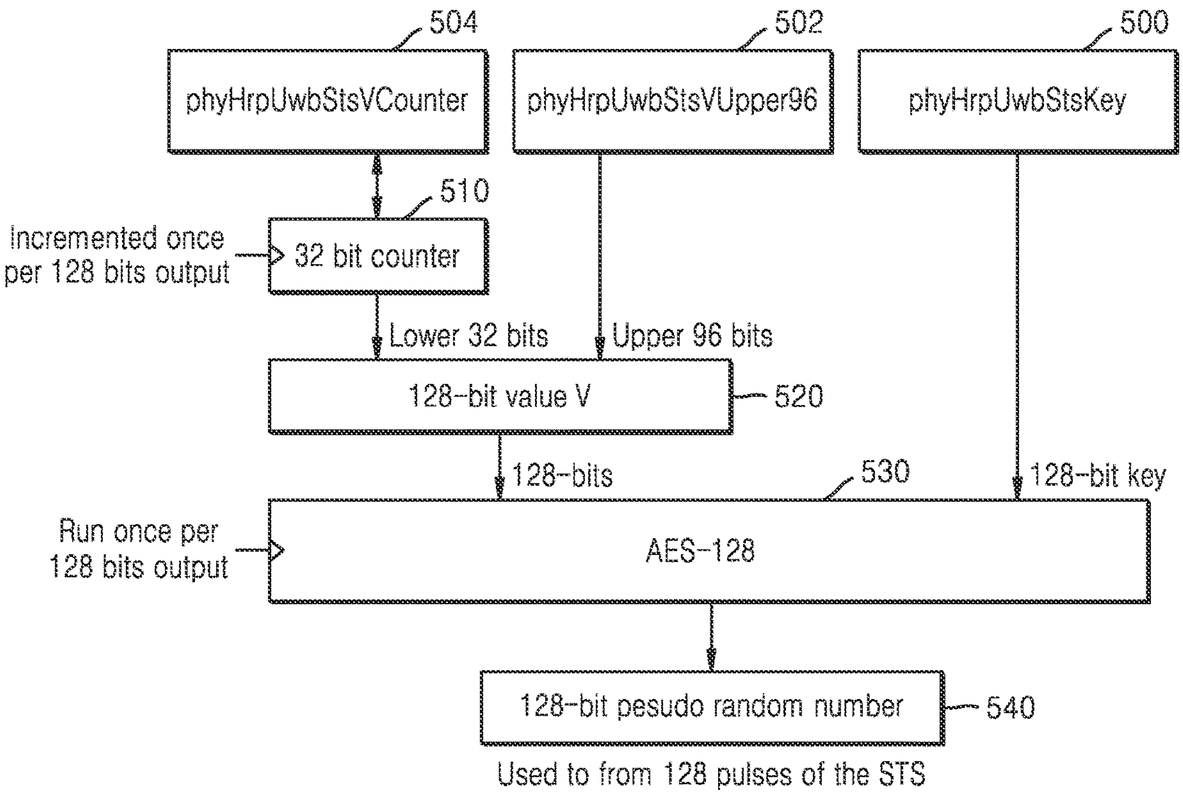
FIG. 5 is a view for describing a method of generating a scrambled timestamp sequence (STS).

FIG. 5 is a view for describing a method of generating the STS.

By two electronic devices, for example a sender and a receiver, the STS may be computed by using a Deterministic Random Bit Generator (DRBG), respectively. When the sender sends the computed STS to the receiver, the receiver may verify that the received STS and a directly computed STS are the same value. When the received STS and the directly computed STS are verified to be the same value, the receiver may trust the received information and use the information for ranging. An STS, once sent and used for verification, is not reused, and the sender and the receiver need to generate a new STS again by using the DRBG every time an STS is sent.

Referring to FIG. 5, in operation 540, a 128-bit pseudo random number may be generated by using an AES-128 hash algorithm defined by NIST.

To generate an STS by using the DRBG, three parameters of phyHarpUwbStsKey 500 (hereinafter StsKey), phyHrpUwbStsVUpper96 502 (hereinafter VUpper), and phyHrpUwbStsVCounter 504 (hereinafter Counter) may be used as input values. The StsKey 500, the VUpper 502, and the Counter 504 are merely names for distinguishing respective factors, and configurations having the same function even when they have different names do not depart from the scope of the disclosure.

In operation 530, the StsKey 500 is a 128-bit long key used in an AES-128 algorithm, and in operation 520, the Counter 504 (32 bit) and the VUpper 502 (96 bit) are values used as input values of AES-128.

In operation 510, once the STS is computed, two electronic devices increase a value of the Counter 504. When the next STS is computed, an increased Counter 504 may be used as an input value. In this case, the same value may be used for the StsKey 500 and the VUpper 502. By repeatedly increasing the value of the Counter 504 and computing the STS, two electronic devices may compute and generate different STS values each time.

In an embodiment, three factors of the StsKey 500, the VUpper 502, and the Counter 504 may be set by an upper layer.

On the other hand, in order to use the three factors in DRBG, the two electronic devices transmitting and receiving an STS need to know the same value beforehand to verify the STS to perform secure ranging. That is, each of the two electronic devices owns the StsKey 500 as secret information, and STS verification may confirm whether each of the two electronic devices owns the corresponding secret information, that is, the StsKey 500. At this time, the 32-bit Counter 504 is a variable value and the other two arguments are reused with the same values as before, so 2^32 (32 powers of 2) STSs may be generated as new values. Accordingly, when a larger number of STSs are generated, the previously used Counter 504 may be reused for DRBG. Thus, the STS having the same value as the STS used in the past may be repeatedly computed and transmitted. Furthermore, when an initial value of the Counter 504 is a predictable value (e.g., initial value 0), a value of the Counter 504 used in the next STS may also be easily predicted (0→1), and thus it is difficult to say that security is guaranteed. When the StsKey 500 owned by the two electronic devices as secret information is generated in an unsecured way or stored and managed in an unsecured place, corresponding secret information may be exposed to a third device, so it is difficult to say that security is guaranteed.

According to an embodiment, when the two electronic devices want to perform secure ranging by using the STS, security may be improved because the StsKey 500 may be safely generated in both the electronic devices, and a value of an unpredictable initial Counter 504 may be used.

Figure 6:
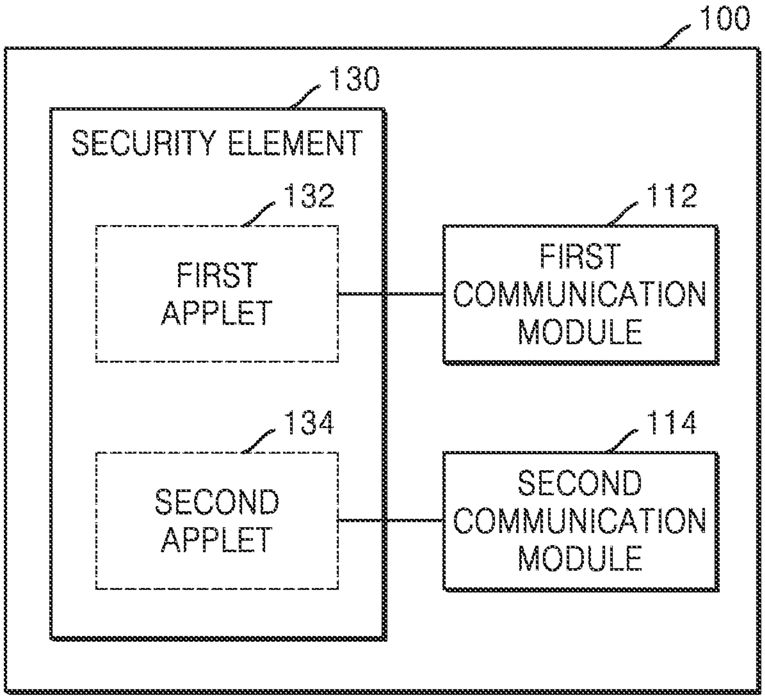
FIG. 6 is a block diagram of a first electronic device according to an embodiment.

Reference is further made to FIG. 6 to describe a structure of a first electronic device for generating values of the StsKey 500 and the initial Counter 504 according to an embodiment.

FIG. 6 is a block diagram of a first electronic device according to an embodiment.

Referring to FIG. 6, the first device 100 may include a first communication module 112, a second communication module 114, and the security element 130.

The first electronic device 100 may be a personalized mobile device, but is not limited thereto and may be various types of electronic devices. For example, the first electronic device 100 may be a smartphone, a tablet PC, a PC, a camera, a wearable device, or the like. The first electronic device 100 may be referred to as a digital key (DK) device 100, a source device 100, a UWB source 100, or the like.

In an embodiment, the first communication module 112 and the second communication module 114 may support communication methods that are independent of each other. In an embodiment, the first communication module 112 may be a UWB communication module 112 and the second communication module 114 may be an NFC module, a Bluetooth module, a Wi-Fi module, a Bluetooth Low Energy (BLE) module, an LTE module, or the like, but are not limited thereto.

The security element 130 of the first electronic device 100 is the independent secure storage device of the electronic device 100 and is a secure area that only authorized applications may access. The security element 130 may be configured to be physically isolated from other hardware configurations. The security element 130 may be divided into a first applet 132 and a second applet 134, as shown in FIG. 6. The first applet 132 and the second applet 134 may be logically divided by their roles, but in practice, one applet may be sufficient.

In an embodiment, the first applet 132 and the second applet 134 may transmit necessary information through internal communication.

In an embodiment, the second applet 134 may perform end-to-end communication with another electronic device, such as a vehicle, a door, a building entrance gate, a hotel door, an entrance system, etc., via a second communication module 114. That other electronic device may be referred to as a second electronic device.

In an embodiment, the second applet 134 may have a security key to establish secure communication with the second electronic device. For example, by installing the same security key on both devices at the beginning of the process, by installing a security key on the second applet 134 through a server, or by generating a security key by the first electronic device 100 and the second electronic device and mutually registering the security key through owner pairing as defined in a digital key specification of Car Connectivity Consortium (Hereafter CCC), the second applet 134 may have a security key to establish secure communication with the second electronic device. The second applet 134 may be referred to as a service applet, a digital key applet (DK Applet), or the like.

According to an embodiment of the disclosure, the second applet 134 may generate a secure channel via the second electronic device and the second communication module 114, and assist the second electronic device and the first applet 132, respectively, in generating a security key to use for secure ranging via the corresponding secure channel. When the first communication module 112 is a UWB communication module, the second applet 134 may provide a secure communication channel other than UWB communication.

The first applet 132 may be located within the security element 130 and may communicate with the first communication module 112. In an embodiment, the first communication module 112 may be a UWB communication module and the first applet 132 may be a UWB applet. According to an embodiment of the disclosure, the first applet may compute values of StsKey, Counter, and VUpper to be used by the first communication module 112 for secure ranging and provide the values to the first communication module 112, but is not limited thereto. The first applet 132 may generate a key used to generate the values of StsKey, Counter, and VUpper. A key that may be used to generate the values of StsKey, Counter, and VUpper in the first electronic device may be referred to as a first key, and a key that may be used to generate the values of StsKey, Counter, and VUpper in the second electronic device may be referred to as a second key.

According to an embodiment of the disclosure, the first communication module 112 may obtain the values of StsKey, Counter, and VUpper from the first applet 132, and may generate an STS by taking the obtained values as input values. Accordingly, the first electronic device 100 may perform UWB secure ranging with another electronic device, that is, the second electronic device.

Figure 7:
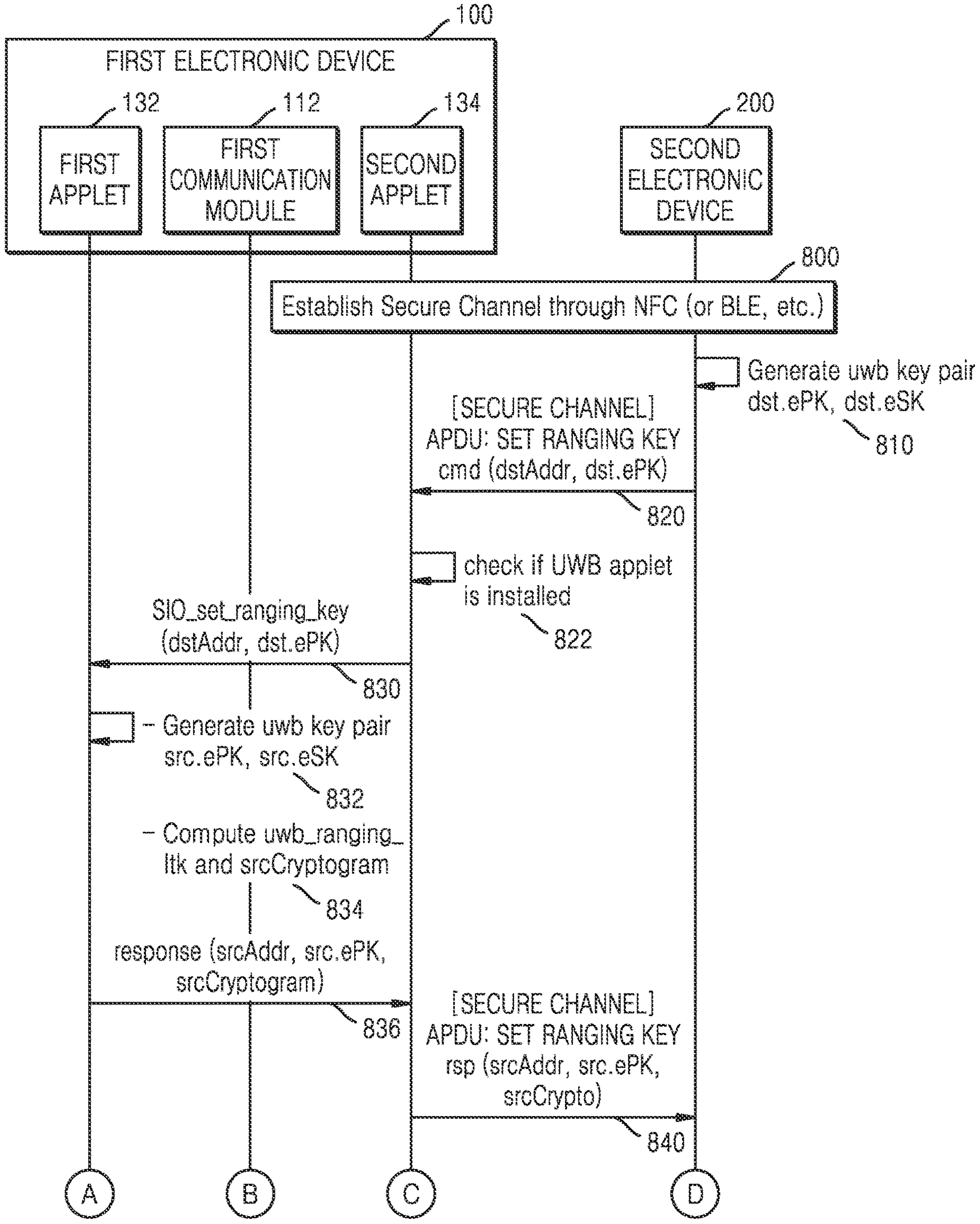
FIG. 7 is a flowchart of a communication method according to an embodiment.

In order to explain a method by which the first electronic device 100 and the second electronic device generates and owns the same key used to generate the values of StsKey, Counter, and VUpper, that is, a symmetric key, reference is further made to FIG. 7.

FIG. 7 is a flowchart of a communication method according to an embodiment of the disclosure.

In operation 710, an electronic device may generate a first key based on a public key of the other electronic device. In this specification, the electronic device may be referred to as a first electronic device, and the other electronic device may be referred to as a second electronic device. The first key may be used for the electronic device to communicate through first communication with the other electronic device. For example, the first key may be used to perform UWB secure ranging for the electronic device to UWB communicate with the other electronic device, and may be used to generate values of StsKey, Counter, and VUpper in the electronic device.

In an embodiment, the electronic device may generate the first key based on a secret key of the electronic device and a public key of the other electronic device. Here, the public key of the other electronic device may be received from the electronic device through a communication method other than a UWB, for example, NFC, Bluetooth, BLE, or the like. In an embodiment, the electronic device may receive the public key of the other electronic device from the other electronic device through second communication based on connection established through the second communication with the other electronic device. For example, the electronic device may receive the public key of the other electronic device via NFC based on the connection established via NFC with the other electronic device. Information received from the other electronic device may be first received by a second applet of the electronic device and may be transmitted from the second applet to the first applet.

In an embodiment, the first key may correspond to identification information of the other electronic device. A correspondence relationship between the first key and the identification information of the other electronic device may be stored in the electronic device. The correspondence relationship between the first key and the identification information of the other electronic device may be stored in a security element of the electronic device and may be stored in the first applet of the security element. The identification information of the other electronic device may be received from the other electronic device to the electronic device. The identification information and the public key of the other electronic device may together be received by the electronic device.

In an embodiment, the first key may be generated by the security element of the electronic device and stored in the security element. For example, the first key may be generated by the first applet of the electronic device and stored in the first applet. Here, the first applet may be a UWB applet.

In an embodiment, the electronic device may transmit the public key of the electronic device to the other electronic device through the second communication. According to an embodiment of the disclosure, the other electronic device may generate a second key based on the private key of the other electronic device and the public key of the electronic device. The first key generated at the electronic device and the second key generated at the other electronic device may correspond to each other. According to an embodiment of the disclosure, the first key and the second key may have the same value as symmetric keys or may have values independent of each other as asymmetric keys. The first key and the second key having the same value as the symmetric keys, or the first key and the second key having the values independent of each other as the asymmetric keys may be referred to as long term keys. Embodiments of the disclosure in which the first key and the second key have independent values as asymmetric keys will be described later with reference to FIGS. 15 and 16.

In operation 720, the electronic device may generate a timestamp sequence based on the first key. In an embodiment, the timestamp sequence may be the STS.

In an embodiment, the STS in the electronic device may be generated based on the first key and additional information. The additional information may include at least one of identification information of the electronic device, a nonce generated by the electronic device, a nonce generated by the security element of the electronic device, identification information of the other electronic device, a nonce generated by the other electronic device, or a nonce generated by a security element of the other electronic device.

In an embodiment, the first key is one of the STS generation factors, and the other one of the STS generation factors may be generated based on the first key. In an embodiment, the electronic device may obtain some of the STS generation factors from the other electronic device.

The method of generating the STS based on the first key is described later with reference to FIGS. 10, 11A, 11B, 12, 13, and 14.

In operation 730, the electronic device may communicate with the other electronic device by using the timestamp sequence. In an embodiment, the electronic device may perform UWB secure ranging with the other electronic device by using the STS, and may further communicate with the other electronic device via UWB.

Figure 8:
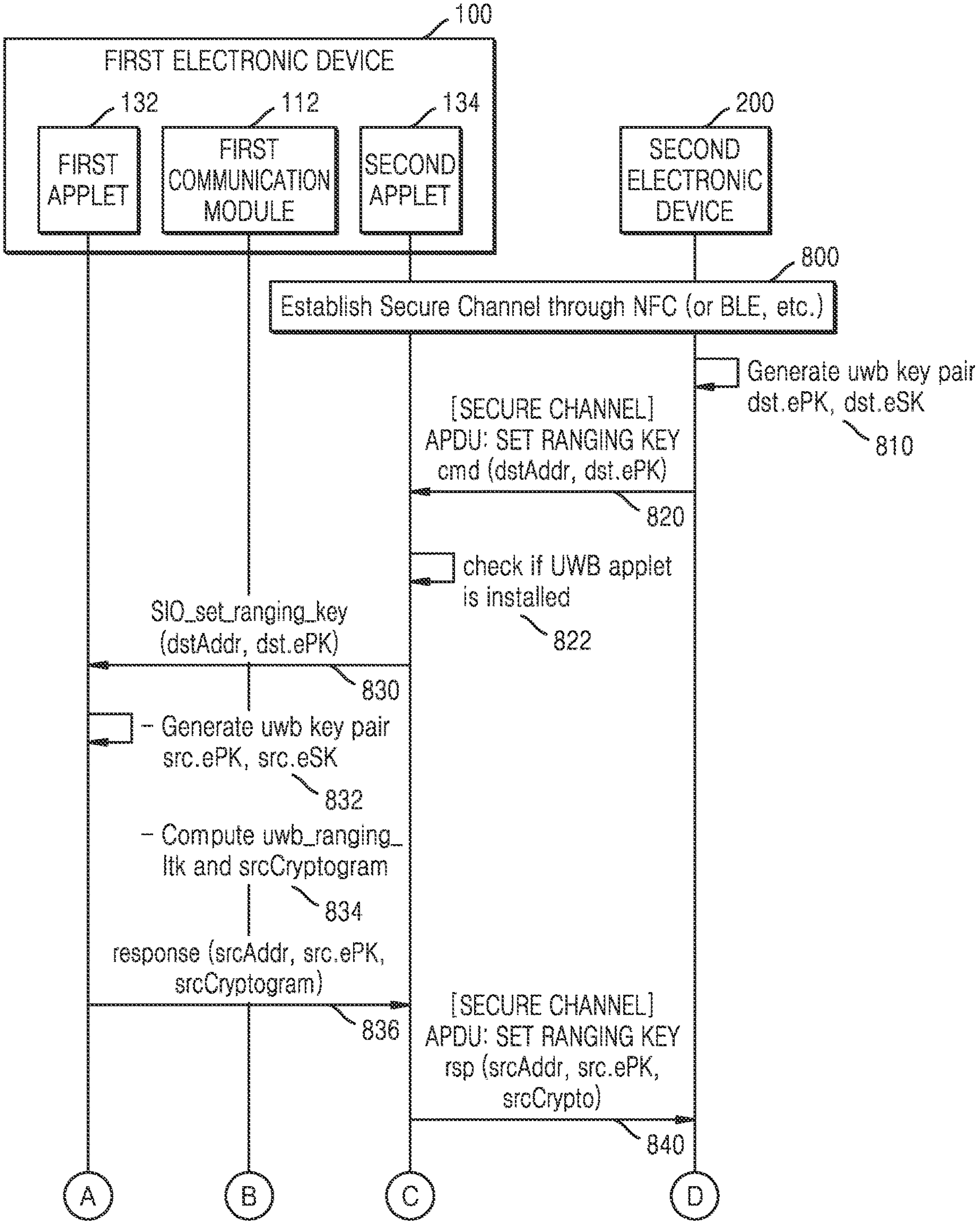
FIG. 8 is a flowchart of a method, performed by a first electronic device, of generating a first key.
Figure 9:
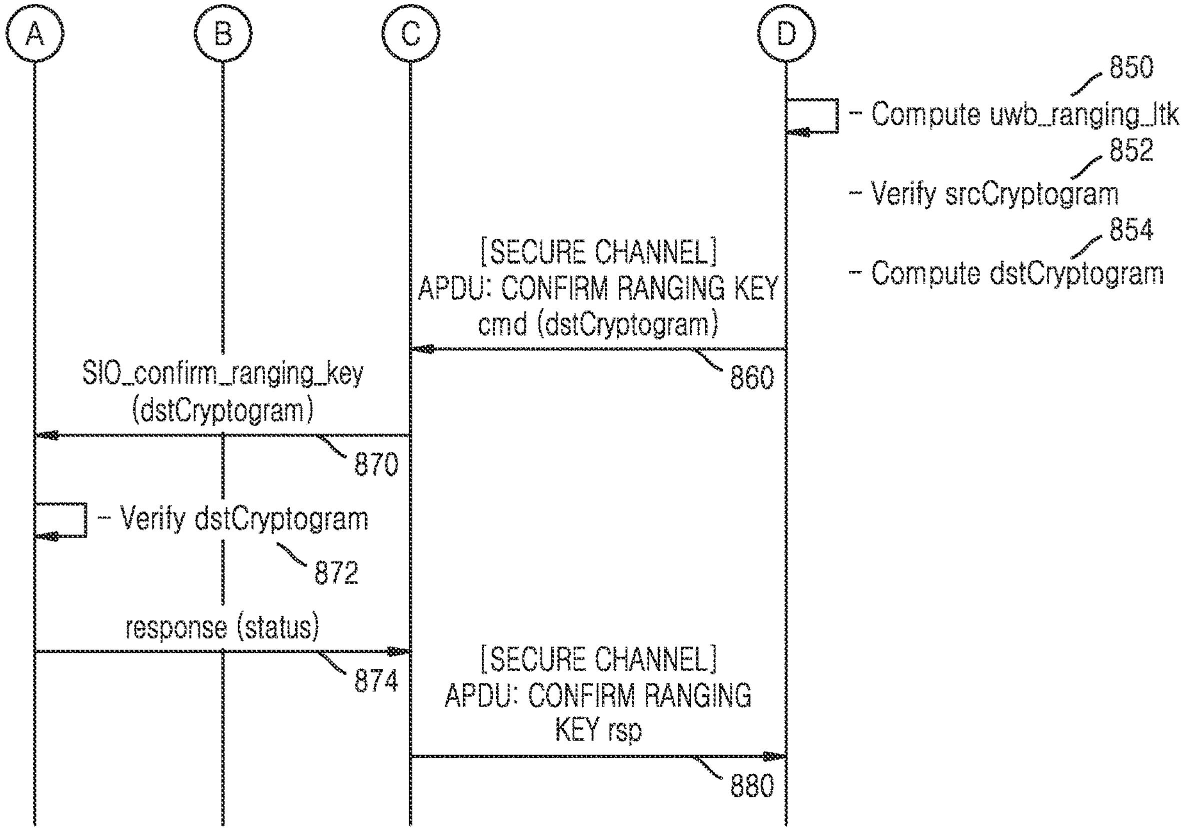
FIG. 9 is a flowchart of a method, performed by a second electronic device, of generating a second key.

Reference is made to FIGS. 8 and 9 to describe in more detail a method of generating a first key and a second key to be used for UWB communication in the electronic device and the other electronic device, respectively.

FIG. 8 is a flowchart of a method, performed by a first electronic device, of generating a first key, and FIG. 9 is a flowchart of a method, performed by a second electronic device, of generating a second key.

In order for the first electronic device 100 and the second electronic device 200 to communicate with each other via UWB, the first electronic device 100 and the second electronic device 200 may be UWB paired.

In operation 800, secure connection through second communication may be established in the first electronic device 100 and the second electronic device 200. For example, the secure connection via NFC between the first electronic device 100 and the second electronic device 200 may be established. That is, the first electronic device 100 and the second electronic device 200 may communicate with each other through a secure channel by a communication method other than UWB. For example, by installing the same security key on the first electronic device 100 and the second electronic device 200 at the beginning of the process, by installing a security key on the second applet 134 through a server, or by generating a security key by the first electronic device 100 and the second electronic device 200 and mutually registering the security key through owner pairing as defined in a digital key specification of CCC, the second applet 134 may have a security key to establish secure communication with the second electronic device 200. The first electronic device 100 and the second electronic device 200 may generate a secure channel by confirming that the first electronic device 100 and the second electronic device 200 are the paired electronic devices. The second applet 134 may be referred to as a service applet, a DK applet, or the like.

In operation 810, the second electronic device 200 may generate a key pair. The key pair may be an asymmetric key. In an embodiment, the key pair is an ephemeral key pair, which may be used temporarily to generate the first key and the second key. For example, the second electronic device 200 may generate an ephemeral secret key dst.eSK and an ephemeral public key dst.ePK. In an embodiment, the key pair is a static key pair, which may be used for a period of time to generate the first key and the second key. The first key and the second key may be used by the first electronic device 100 and the second electronic device 200 to perform UWB secure ranging, and may be used to perform UWB pairing for the UWB secure ranging. In an embodiment, key pair generation of the second electronic device 200 may be performed before the secure connection through the second communication is established in the first electronic device 100 and the second electronic device 200. That is, the key pair of the second electronic device 200 may then be sufficient to be generated before transmitting a public key of the second electronic device 200 to the first electronic device 100.

In operation 820, the second electronic device 200 may request the UWB pairing for the UWB secure ranging from the first electronic device 100. The second electronic device 200 may transmit the ephemeral public key dst.ePK of the second electronic device 200 to the first electronic device 100 via the pre-generated secure channel. The second applet 134 of the first electronic device 100 may receive the ephemeral public key dst.ePK of the second electronic device 200 via a second communication module 114, for example, an NFC module. In an embodiment, identification information dstAddr of the second electronic device 200 may be received from the second electronic device 200 to the first electronic device 100 together with the ephemeral public key dst.ePK. The identification information dstAddr of the second electronic device 200 may include a media access control (MAC) address of the second electronic device 200. In operation 820, a "SET RANGING KEY" command may be used. In an embodiment, the first electronic device 100 may request the UWB pairing from the second electronic device 200.

In operation 822, the second applet 134 of the first electronic device 100 may determine whether the first applet 132 is available at a security element SE whether the first applet 132 is available. When the first applet 132 and the second applet 134 are not distinguished from each other separately, the second applet 134 may confirm a version or the like to see whether the UWB pairing may be performed on the request of the second electronic device 200.

In operation 830, when the first applet 132 is available, the second applet 134 may transmit information received from the second electronic device to the first applet 132. When the first applet 132 and the second applet 134 are not distinguished from each other in the security element SE, operation 830 may be omitted.

In operation 832, the first applet 132 may generate a key pair for use in the UWB secure ranging with the second electronic device 200. The key pair may be an asymmetric key. The key pair is an ephemeral key pair, which may be used temporarily to generate the first key and the second key.

For example, the first electronic device 100 may generate an ephemeral secret key dst.eSK and an ephemeral public key dst.ePK. The first key and the second key may be used by the first electronic device 100 and the second electronic device 200 to perform the UWB secure ranging, and may be used to perform UWB pairing for the UWB secure ranging. In an embodiment, key pair generation of the first electronic device 100 may also be performed before the secure connection through the second communication is established in the first electronic device 100 and the second electronic device 200. That is, the key pair of the first electronic device 100 may then be sufficient to be generated before the first electronic device 100 uses a secret key src.eSK thereof to generate the first key.

In operation 834, the first applet 132 may generate the first key based on the secret key src.eSK of the first electronic device 100 and a public key dst.ePK of the second electronic device 200. According to an embodiment of the disclosure, the first applet 132 may generate a Diffie-Hellman key Kdh based on the secret key src.eSK of the first electronic device 100 and the public key dst.ePK of the second electronic device 200. The Diffie-Hellman key Kdh may be 32 bytes. Elliptic Curve Key Agreement Algorithm-Anonymous Diffie-Hellman Key Agreement (ECKA-DH) or the like may be used to generate the Diffie-Hellman key Kdh, but is not limited thereto. The first key may include a portion of the Diffie-Hellman key Kdh. For example, the first 16 bytes of the Diffie-Hellman key Kdh may be stored as the first key, but is not limited thereto. According to an embodiment of the disclosure, the remainder except for the first key in the Diffie-Hellman key Kdh may be stored as a cryptogram calculation key Kc. For example, the latter 16 bytes of the Diffie-Hellman key Kdh may be stored as the cryptographic calculation key Kc, but is not limited thereto. According to an embodiment of the disclosure, the first applet 132 may generate a message authentication code (srcCryptogram) of the first electronic device 100 by using the cryptographic calculation key Kc.

In operation 836, the first applet 132 may send the public key src.ePK of the first electronic device 100 to the second applet 134. In an embodiment, identification information srcAddr of the first electronic device 100 may be transmitted to the second applet 134 along with the ephemeral public key src.ePK. The identification information dstAddr of the first electronic device 100 may include the MAC address of the first electronic device 100. In an embodiment, the message authentication code of the first electronic device 100 may be transmitted to the second applet 134 along with the identification information srcAddr and the ephemeral public key src.ePK. Moreover, when the first applet 132 and the second applet 134 are not distinguished from each other in the security element, operation 836 may be omitted.

In operation 840, the second applet 134 may transmit information received from the first applet 132 to the second electronic device 200 via the second communication module 114. For example, the second applet 134 may transmit the information received from the first applet 132 to the second electronic device 200 via NFC. The information received from the first applet 132 by the second applet 134 may include the identification information srcAddr, the public key src.ePK, and the message authentication code (srcCryptogram) of the first electronic device 100. In operation 840, a "SET RANGING KEY" response may be used.

In operation 850, the second electronic device 200 may compute and store the second key for UWB secure ranging by using information received from the second applet 134. The second key may have the same value as that of the first key as a symmetric key of the first key. The first key and the second key having the same value as symmetric keys may be referred to as long term keys.

In operation 852, the second electronic device 200 may verify the message authentication code (srcCryptogram) of the first electronic device 100. The verification of the message authentication code (srcCryptogram) of the first electronic device 100 may be performed by using a private key of the second electronic device 200 and a public key of the first electronic device 100. The cryptographic calculation key Kc generated by using the secret key of the second electronic device 200 and the public key of the first electronic device 100 may be used for verification. When the message authentication code (srcCryptogram) of the first electronic device 100 is verified, the second electronic device 200 stores information received from the first electronic device 100. The information received from the first electronic device 100 to the second electronic device 200 may include the identification information srcAddr, the public key src.ePK, and the message authentication code (srcCryptogram) of the first electronic device 100.

In operation 854, the second electronic device 200 may compute a message authentication code (dstCryptogram) of the second electronic device 200 to determine whether the first key and the second key are the same. The second electronic device 200 may generate the message authentication code (dstCryptogram) in the same manner as the first electronic device 100.

In operation 860, the second electronic device 200 may transmit the message authentication code (dstCryptogram) to the second applet 134 of the first electronic device 100. In operation 860, a "CONFIRM RANGING KEY" command may be used.

In operation 870, the second applet 134 may transmit information received from the second electronic device 200 to the first applet 132. For example, the second applet 134 may transmit the message authentication code (dstCryptogram) of the second electronic device 200 to the first applet 132. When the first applet 132 and the second applet 134 are not distinguished from each other in the security element, operation 870 may be omitted.

In operation 872, the first applet 132 may verify the message authentication code (dstCryptogram) of the second electronic device 200. The verification of the message authentication code (dstCryptogram) of the second electronic device 200 may be performed by using the private key of the first electronic device 100 and the public key of the second electronic device 200. By using the same method as in operation 834, a key for computing a cryptogram (dstcryptogram) generated by using the secret key of the first electronic device 100 and the public key of the second electronic device 200 may be used for verification. When the message authentication code (dstCryptogram) of the second electronic device 200 is verified, in operation 874, the first applet 132 may return a verification result to the second applet 134. When the first applet 132 and the second applet 134 are not distinguished from each other in the security element, operation 874 may be omitted.

In operation 880, the second applet 134 may transmit the verification result received from the first applet 132 to the second electronic device 200.

The second electronic device 200 stores the information received from the first electronic device 100. The information received from the first electronic device 100 to the second electronic device 200 may include the identification information srcAddr, the public key src.ePK, and the identification information srcAddr of the first electronic device 100. In operation 880, a "CONFIRM RANGING KEY" response may be used.

When all of the above operations are successful, the first electronic device 100 and the second electronic device 200 have the same symmetric key, that is, a long term key, with each other and can be seen as successfully UWB paired.

According to an embodiment of the disclosure, the connection between the first electronic device 100 and the second electronic device 200 may be terminated after the pairing.

According to an embodiment of the disclosure, in a process in which the first electronic device 100 and the second electronic device 200 generate and own a first key and a second key, respectively, to be used for UWB communication, only the identification information (srcAddr, dstAddr), the public keys (src.ePK, dst.ePK), and the message authentication code (srcCryptogram, dstCryptogram) of the first electronic device 100 and the second electronic device 200 are exposed to the outside. Therefore, the long term key may be safely managed.

According to an embodiment of the disclosure, in the process of generating an STS based on the first key and the second key generated in the first electronic device 100 and the second electronic device 200, respectively, an STS generation factor may be generated with a value that is difficult to predict. A method of generating STS generation factors will be described with reference to FIGS. 10, 11A, 11B, 12, 13, and 14.

Figure 10:
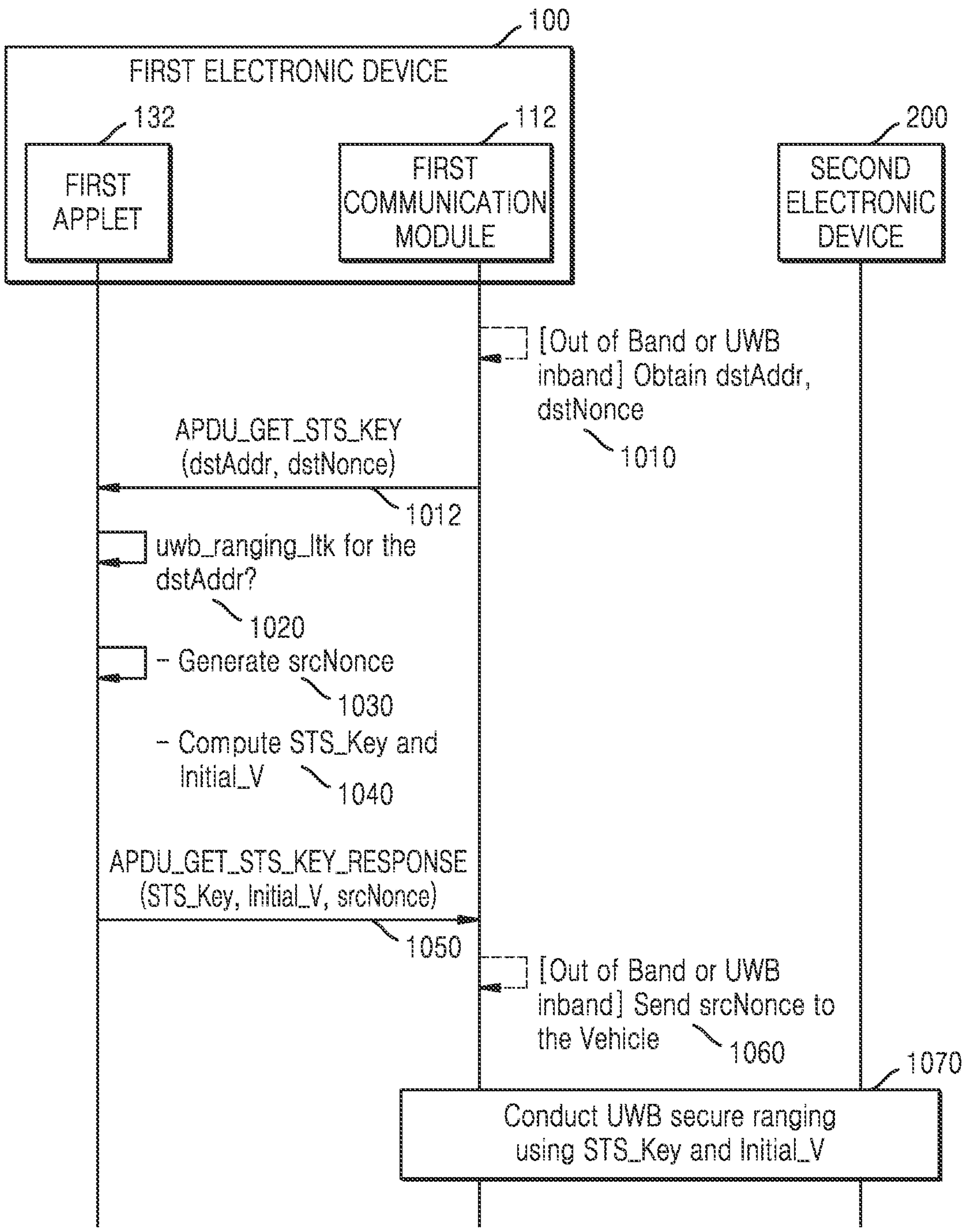
FIG. 10 is a flowchart of a method of generating STS generation factors by using nonces of two electronic devices.

FIG. 10 is a flowchart of a method of generating STS generation factors by using nonces of two electronic devices.

As described above, three factors may be used to generate an STS: StsKey, VUpper, and Counter. StsKey, VUpper, and Counter are merely names for distinguishing respective factors, and configurations having the same function even when they have different names do not depart from the scope of the disclosure.

Assuming that the first electronic device 100 and the second electronic device 200 are successfully paired through the above-described process with reference to FIGS. 8 and 9, the method of generating the STS generation factors of FIG. 10 will be described later below. Further, it is assumed that the communication performed inside the first electronic device 100, for example, between an applet and a communication module, is secure.

In operation 1010, the first communication module 112 of the first electronic device 100 may obtain identification dstAddr and a nonce dstNonce of the second electronic device 200. The identification information dstAddr of the second electronic device 200 may include the MAC address of the second electronic device 200. The nonce dstNonce of the second electronic device 200 indicates a random value generated by the second electronic device 200.

In an embodiment, the identification information dstAddr and the nonce dstNonce of the second electronic device 200 may be obtained through the first communication module 112. For example, the identification information dstAddr and the nonce dstNonce of the second electronic device 200 may be obtained in the first electronic device 100 in UWB inband through a pre-generated UWB channel between the first electronic device 100 and the second electronic device 200. The information obtained through the first communication module 112 may be transmitted directly from the first communication module 112 to the first applet 132.

In an embodiment, the identification information dstAddr and the nonce dstNonce of the second electronic device 200 may be obtained via the second communication module 114. For example, the identification information dstAddr and the nonce dstNonce of the second electronic device 200 may be obtained in the first electronic device 100 in UWB out-of-band through a pre-generated channel such as NFC, Bluetooth, BLE, etc. between the first electronic device 100 and the second electronic device 200. The information obtained in UWB out-of-band via the second communication module 114 may be transmitted to the first applet 132 through the second applet 134.

In operation 1012, the first communication module 112 may transmit the information obtained from the second electronic device 200 to the first applet 132. That is, the first communication module 112 may transmit the identification information dstAddr and the nonce dstNonce of the second electronic device 200 to the first applet 132. Furthermore, the first communication module 112 may request generation of a StsKey to be used for performing UWB secure ranging with the second electronic device 200. In operation 1012, a "GET_STS_KEY" command may be used.

In operation 1020, the first applet 132 may verify whether a valid first key corresponding to the identification information dstAddr of the second electronic device 200 is stored. When a valid first key corresponding to the identification information dstAddr of the second electronic device 200 is not stored, an error may be returned and the process may be stopped.

In operation 872, the first applet 132 may generate a nonce srcNonce of the first electronic device 100.

In operation 1040, the first applet 132 may generate StsKey based on additional information, that is, at least one of the nonce srcNonce of the first electronic device 100, the nonce dstNonce of the second electronic device 200, the identification information srcAddr of the first electronic device 100, or the identification information dstAddr of the second electronic device 200, and the first key corresponding to the identification information dstAddr of the second electronic device 200. Among the nonce srcNonce of the first electronic device 100, the nonce dstNonce of the second electronic device 200, the identification information srcAddr of the first electronic device 100, and the identification information dstAddr of the second electronic device 200, which information will be used to generate the StsKey may be predetermined and known to the first electronic device 100 and the second electronic device 200. According to an embodiment of the disclosure, the first applet 132 may also generate an initial value Initial_V when generating the StsKey.

In operation 1050, the first applet 132 may transmit the generated StsKey, Initial_V, and srcNonce to the first communication module 112. In operation 1050, a "GET STS KEY" response may be used.

In operation 1060, the first communication module 112 may send the nonce srcNonce of the first electronic device 100 to the second electronic device 200.

In an embodiment, the srcNonce of the first electronic device 100 may be sent to the second electronic device 200 via the first communication module 112. For example, the nonce srcNonce of the first electronic device 100 may be sent to the second electronic device 200 in UWB inband through the pre-generated UWB channel between the first electronic device 100 and the second electronic device 200.

In an embodiment, the nonce srcNonce of the first electronic device 100 may be sent to the second electronic device 200 via the second communication module 114. For example, the nonce srcNonce of the first electronic device 100 may be sent to the second electronic device 200 in UWB out-of-band through a pre-generated channel such as NFC, Bluetooth, BLE, etc. between the first electronic device 100 and the second electronic device 200. In more detail, the nonce srcNonce of the first electronic device 100 may be generated in the first applet 132, sent to the second applet 134, and further, sent from the second applet 134 to the second electronic device 200 via the second communication module 114.

In operation 1070, an STS may be generated by using StsKey and Initial_V. In an embodiment, the first communication module 112 may obtain Counter and VUpper from Initial_V. According to an embodiment of the disclosure, a portion of Initial_V may be set to Counter, and the remaining may be set to VUpper. For example, the first 32 bits of Initial_V may be set to Counter and the latter 96 bits of Initial_V may be set to VUpper, and the latter 32 bits may be set to Counter and the first 96 bits may be set to VUpper, wherein theymay be set by the number of bits already specified by an acquisition rule, but the number of bits and a method of setting the bits are not limited thereto. The rule for obtaining Counter and VUpper from Initial_V may be known to the first electronic device 100 and the second electronic device 200 in advance or may be externally received, or one device may transmit the rule to the other device.

In an embodiment, the second electronic device 200 may receive the nonce srcNonce from the first electronic device 100 to generate an STS by using the same combination as that of the first electronic device 100. That is, the second electronic device 200 may obtain STS generation factors by using the same additional information as that of the first electronic device 100, that is, the nonce srcNonce of the first electronic device 100, the nonce dstNonce of the second electronic device 200, the identification information srcAddr of the first electronic device 100, and the identification information dstAddr of the second electronic device 200, and a second key corresponding to the first key.

According to an embodiment of the disclosure, because the first electronic device 100 and the second electronic device 200 may set the STS generation factors to an unpredictable value even without directly exchanging the STS generation factors, security of UWB communication between the first electronic device 100 and the second electronic device 200 may be enhanced.

According to an embodiment of the disclosure, in the case of generating the STS by using nonces of the electronic devices 100 and 200, as an encryption process increases, security may be enhanced. However, because security and speed are in a trade-off relationship, the degree of security may be determined based on the performance of the electronic devices 100 and 200. For example, when the performances of the two electronic devices 100 and 200 are determined to be equal to or higher than a certain level, the STS is generated by using all additional information of the two electronic devices 100 and 200, that is, the nonce srcNonce of the first electronic device 100, the nonce dstNonce of the second electronic device 200, the identification information srcAddr of the first electronic device 100, and the identification information dstAddr of the second electronic device 200 and when the performances of the two electronic devices 100 and 200 are both determined to be lower than or equal to a certain level or one of the performances is determined to be lower than or equal to the certain level, both the electronic devices 100 and 200 may be implemented to generate the STS by using some of the additional information. The performance may include processing performance, memory performance, network performance, and the like.

Figure 11A:
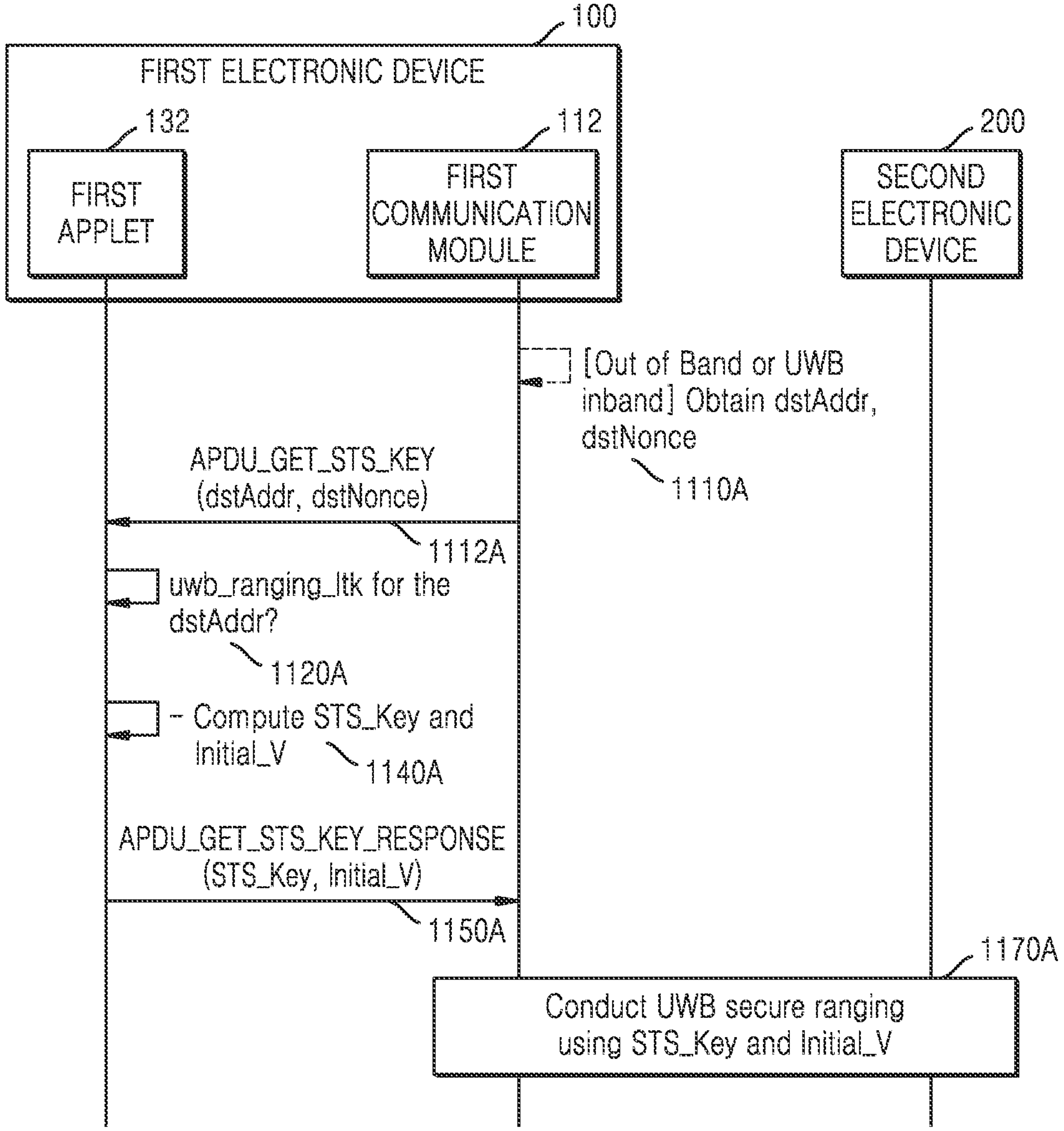
FIG. 11A is a flowchart of a method of generating STS generation factors by using a nonce of a second electronic device.

FIG. 11A is a flowchart of a method of generating STS generation factors by using a nonce of a second electronic device.

Operations 1110A, 1112A, 1120A, and 1170A of the method of FIG. 11A are substantially the same as operations 1010, 1012, 1020, and 1070 of the method of FIG. 10, and thus redundant descriptions are omitted. In addition, the method of FIG. 11A may be performed while omitting operations 1030 and 1060 of the method of FIG. 10.

In operation 1140A, the first applet 132 may generate the StsKey based on additional information, that is, at least one of the nonce dstNonce of the second electronic device 200, the identification information srcAddr of the first electronic device 100, or the identification information dstAddr of the second electronic device 200, and a first key. Among the nonce dstNonce of the second electronic device 200, the identification information srcAddr of the first electronic device 100, and the identification information dstAddr of the second electronic device 200, which information will be used to generate the StsKey may be predetermined and known to the first electronic device 100 and the second electronic device 200. According to an embodiment of the disclosure, the first applet 132 may also generate the initial value Initial_V when generating the StsKey.

The second electronic device 200 may generate an STS by using the same combination as that of the first electronic device 100. That is, the second electronic device 200 may obtain STS generation factors by using the same additional information as that of the first electronic device 100, that is, the nonce dstNonce of the second electronic device 200, the identification information srcAddr of the first electronic device 100, and the identification information dstAddr of the second electronic device 200, and a second key corresponding to the first key corresponding to the identification information dstAddr of the second electronic device 200.

In operation 1050A, the first applet 132 may transmit the generated StsKey and Initial_V to the first communication module 112. In operation 1050A, the "GET STS KEY" response may be used.

Figure 11B:
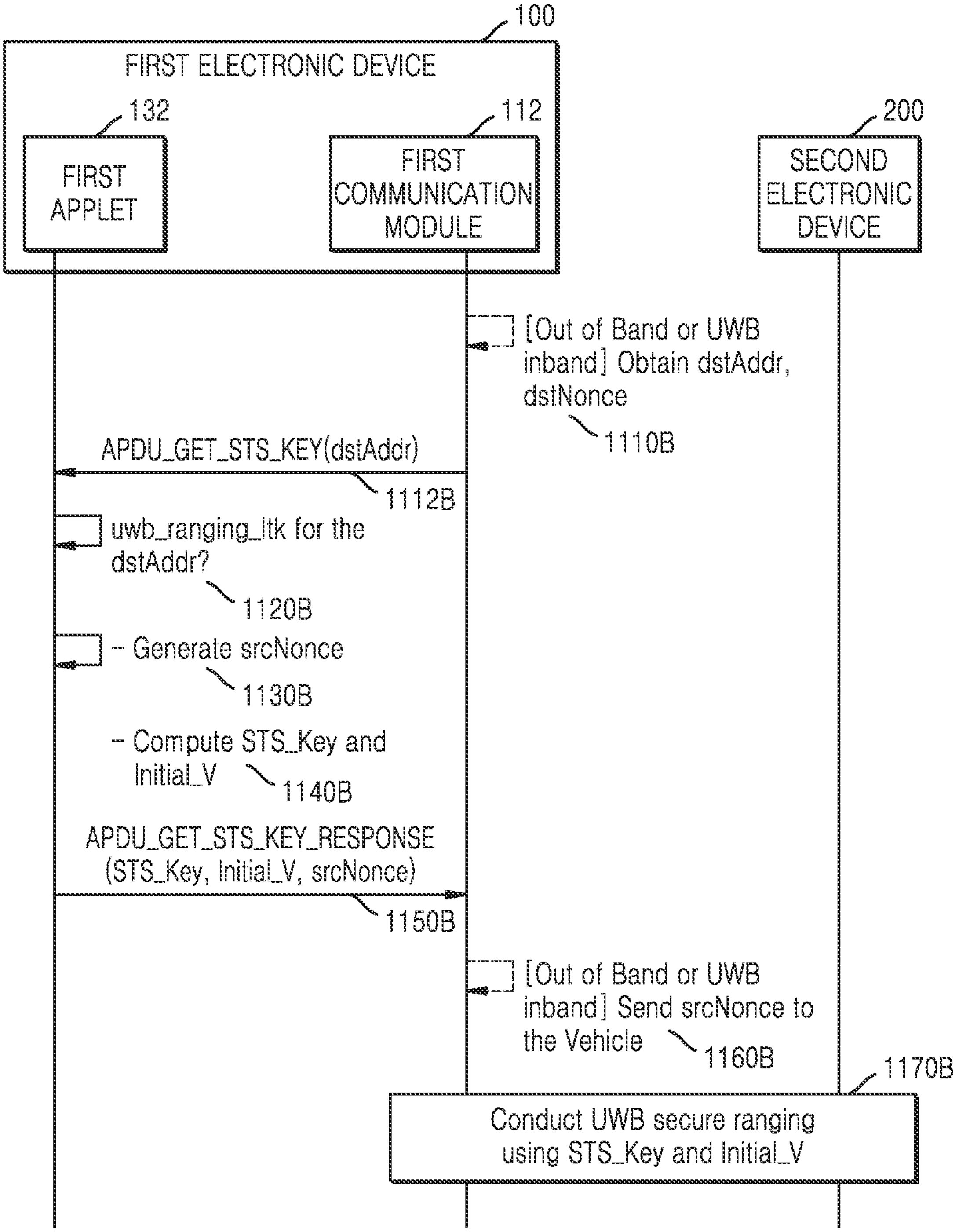
FIG. 11B is a flowchart of a method of generating STS generation factors by using a nonce of a first electronic device.

FIG. 11B is a flowchart of a method of generating STS generation factors by using a nonce of a first electronic device.

Operations 1110B, 1112B, and 1140 of FIG. 11B are distinguished from the method of FIG. 10, and operations 1120B, 1130B, 1150B, 1160B, and 1170B are substantially the same as operations 1020, 1030, 1050, 1060, and 1070 of the method of FIG. 10, and thus redundant description is omitted.

In operation 1110B, the first communication module 112 of the first electronic device 100 may obtain identification information dstAddr of the second electronic device 200.

In an embodiment, the identification information dstAddr of the second electronic device 200 may be obtained through the first communication module 112. For example, the identification information dstAddr of the second electronic device 200 may be obtained in the first electronic device 100 in UWB inband through a pre-generated UWB channel between the first electronic device 100 and the second electronic device 200. The information obtained through the first communication module 112 may be transmitted directly from the first communication module 112 to the first applet 132.

In an embodiment, the identification information dstAddr of the second electronic device 200 may be obtained via the second communication module 114. For example, the identification information dstAddr of the second electronic device 200 may be obtained in the first electronic device 100 in a channel (UWB out-of-band) different from the UWB channel through a pre-generated channel such as NFC, Bluetooth, BLE, etc. between the first electronic device 100 and the second electronic device 200. The information obtained in UWB out-of-band via the second communication module 114 may be transmitted to the first applet 132 through the second applet 134.

In operation 1012B, the first communication module 112 may transmit the information obtained from the second electronic device 200 to the first applet 132. That is, the first communication module 112 may transmit the identification information dstAddr of the second electronic device 200 to the first applet 132.

In operation 1140B, the first applet 132 may generate StsKey based on additional information, that is, at least one of the nonce srcNonce of the first electronic device 100, the identification information srcAddr of the first electronic device 100, or the identification information dstAddr of the second electronic device 200, and a first key corresponding to the identification information dstAddr of the second electronic device 200. Among the nonce srcNonce of the first electronic device 100, the identification information srcAddr of the first electronic device 100, and the identification information dstAddr of the second electronic device 200, which information will be used to generate the StsKey may be predetermined and known to the first electronic device 100 and the second electronic device 200. According to an embodiment of the disclosure, the first applet 132 may also generate the initial value Initial_V when generating the StsKey.

The second electronic device 200 may generate an STS by using the same combination as that of the first electronic device 100. That is, the second electronic device 200 may obtain STS generation factors by using the same additional information as that of the first electronic device 100, that is, the nonce srcNonce of the first electronic device 100, the identification information srcAddr of the first electronic device 100, and the identification information dstAddr of the second electronic device 200, and a second key corresponding to the first key.

According to an embodiment of the disclosure, when it is determined that performances of the electronic devices 100 and 200 are equal to or higher than a certain level, nonces of the electronic devices 100 and 200 are both used or obtained and when the performances of the electronic devices 100 and 200 are both lower than or equal to a certain level or one of the performances is lower than or equal to the certain level, at least some of the nonces of the two electronic devices 100 and 200 may be used or obtained to generate an STS. The performance may include processing performance, memory performance, network performance, and the like.

Figure 12:
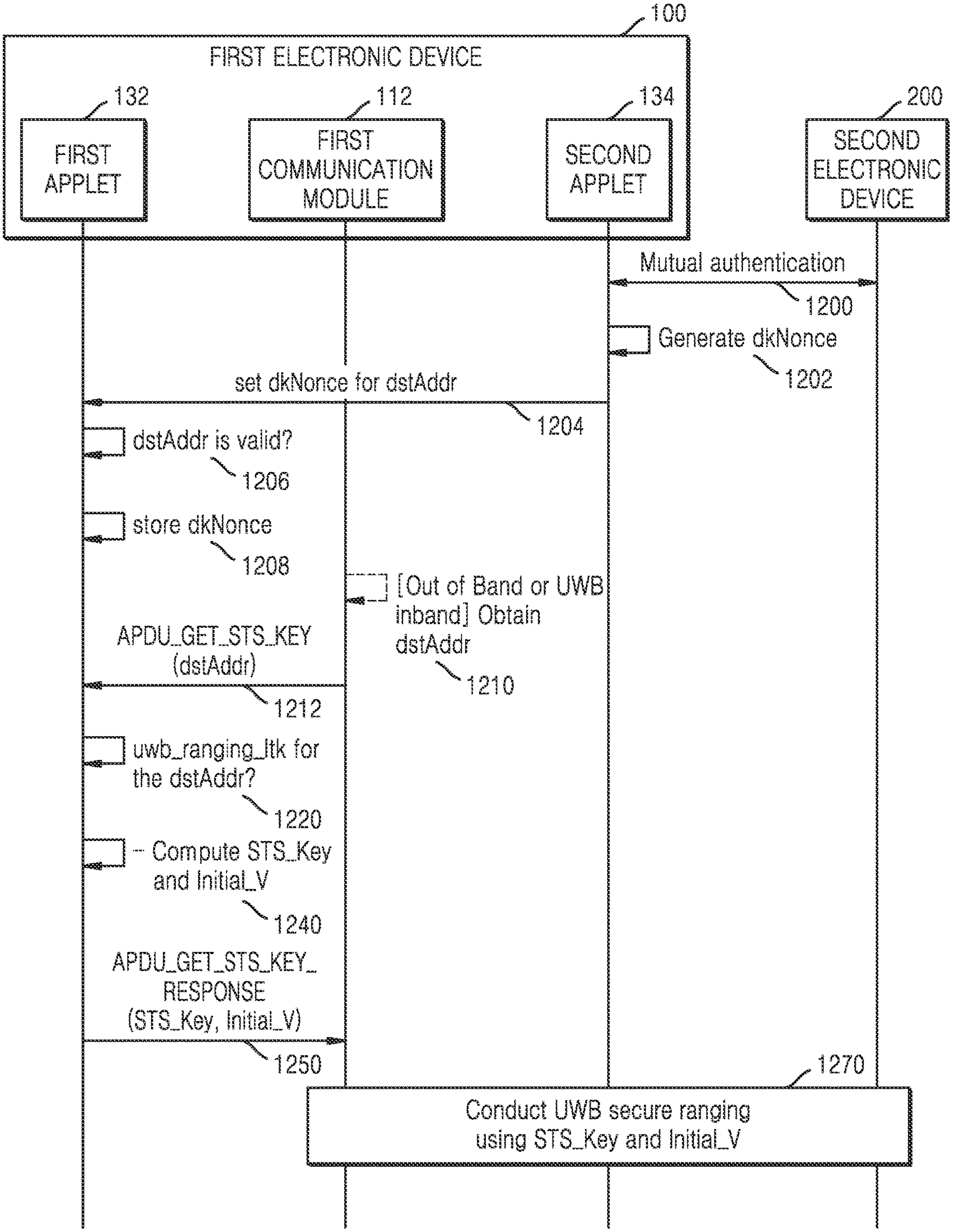
FIG. 12 is a flowchart of a method of generating STS generation factors by using a nonce generated by a security element of a first electronic device.

FIG. 12 is a flowchart of a method of generating STS generation factors by using a nonce generated by a security element of a first electronic device.

The method of FIG. 12 may be distinguished from the methods of FIGS. 10, 11A, and 11B in that a nonce is generated by the second applet 134, which is the security element of the first electronic device 100.

In operation 1200, the first electronic device 100 and the second electronic device 200 perform mutual authentication. The second applet 134 of the first electronic device 100 may perform mutual authentication with the second electronic device 200. In an embodiment, the mutual authentication may be performed through a second communication module that supports NFC, Bluetooth, BLE, and the like. A mutual authentication algorithm may be performed according to a method defined in a CCC digital key standard.

In operation 1202, the second applet 134 of the first electronic device 100 may generate a nonce dkNonce. The nonce dkNonce of the second applet 134 may be generated by using at least one of a transaction ID of mutually authenticated connection between the second electronic device and the second applet 134 or a long term key of a secure channel generated after the mutual authentication. The nonce dkNonce of the second applet 134 may be generated by the second electronic device 200 and sent securely to the first electronic device 100.

In operation 1204, the second applet 134 may transmit the nonce dkNonce to be used for UWB secure ranging with the second electronic device 200 corresponding to the identification information dstAddr of the second electronic device 200 to the first applet 132.

In operation 1206, the first applet 132 may verify whether a first key corresponding to the identification information dstAddr of the second electronic device 200 is stored. When a valid first key corresponding to the identification information of the second electronic device 200 is not stored, an error may be returned and the process may be stopped.

In operation 1208, the first applet 132 may store the nonce dkNonce of the second applet 134 as a nonce value to be used for UWB ranging with the second electronic device 200.

Operations 1210, 1212, and 1220 of the method of FIG. 12 are substantially the same as operations 1110B, 1112B, and 1120B of the method of FIG. 11B, and thus redundant description is omitted.

In operation 1240, StsKey may be generated based on at least one of the nonce dkNonce of the second applet 134 stored in operation 1208, the identification information srcAddr of the first electronic device 100, or the identification information dstAddr of the second electronic device 200, and the first key corresponding to the identification information dstAddr of the second electronic device 200. Among the nonce dkNonce of the second applet 134, the identification information srcAddr of the first electronic device 100, and the identification information dstAddr of the second electronic device 200, which information will be used to generate the StsKey may be predetermined and known to the first electronic device 100 and the second electronic device 200. According to an embodiment of the disclosure, the first applet 132 may also generate the initial value Initial_V when generating the StsKey.

In operation 1250, the first applet 132 may transmit the generated StsKey and Initial_V to the first communication module 112. In operation 1250, the "GET STS KEY" response may be used.

Operation 1270 of the method of FIG. 12 is substantially the same as operation 1070 of the method of FIG. 10, and thus redundant description is omitted.

Figure 13:
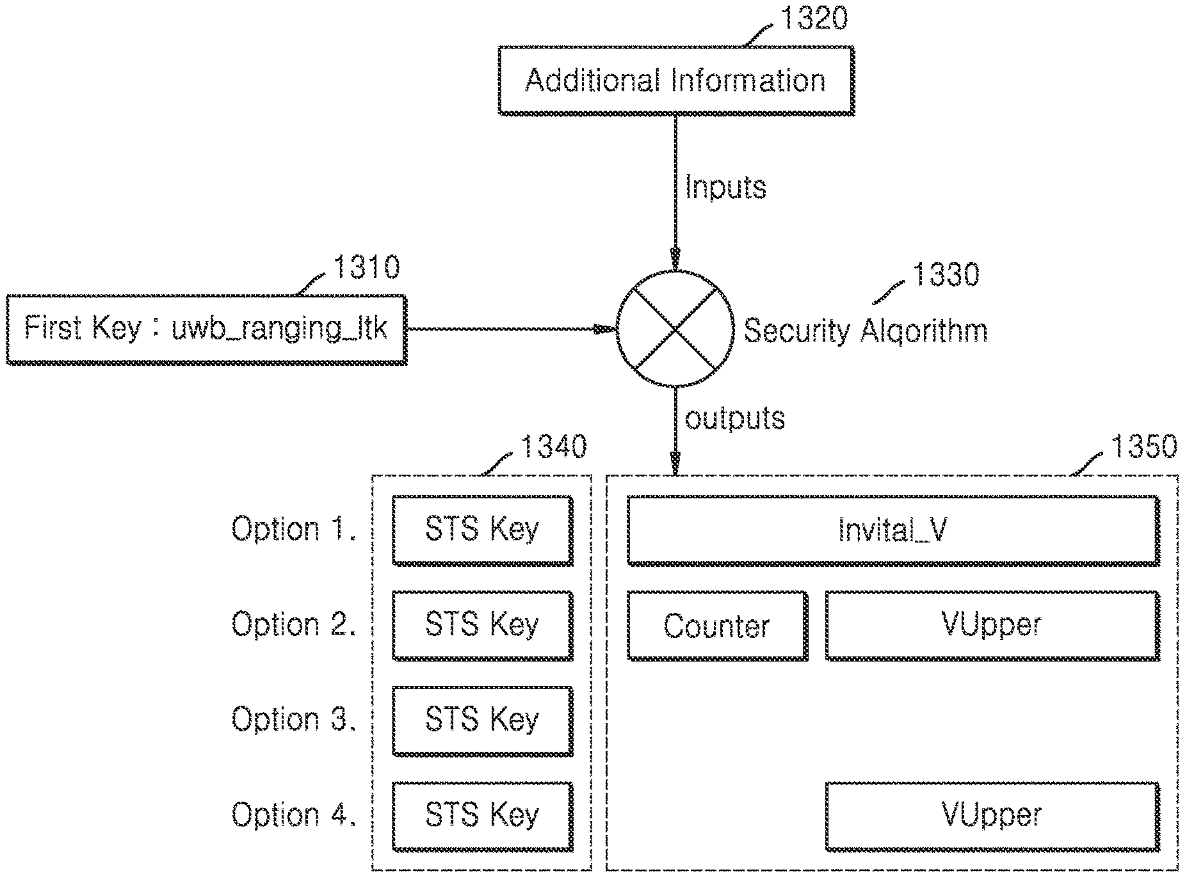
FIG. 13 is a view for describing generation scenarios of STS generation factors.

FIG. 13 is a view for describing generation scenarios of STS generation factors.

Referring to FIG. 13, a first applet of a first electronic device may generate a StsKey 1340 based on a first key 1310 and additional information 1320. In an embodiment, the first key 1310 may be used as a key value of a security algorithm, for example, a Cipher-based Message Authentication Code (CMAC) algorithm using AES-128, and the additional information 1320 may be input as input values for a corresponding security algorithm 1330.

Values in operations 1340 and 1350 of FIG. 13 illustrate values that may be transmitted from a first applet to a first communication module.

Referring to option 1, the first applet of the first electronic device may generate and transmit StsKey and Initial_V to the first communication module. The first communication module, which has received StsKey and Initial_V, may obtain Counter and VUpper from Initial_V. According to an embodiment of the disclosure, a portion of Initial_V may be set to Counter, and the remaining may be set to VUpper. For example, the first 32 bits of Initial_V may be set to Counter and the latter 96 bits may be set to VUpper, but are not limited thereto. The rule for obtaining Counter and VUpper from Initial_V may be known to the first electronic device 100 and the second electronic device 200 in advance.

Referring to option 2, the first applet of the first electronic device may generate all of StsKey, Counter, and VUpper. The first applet may transmit the generated StsKey, Counter, and VUpper to the first communication module.

Referring to option 3, the first applet of the first electronic device may generate and transmit StsKey to the first communication module. In an embodiment, Counter and VUpper may be received by the first communication module from the second electronic device 200 in UWB in-band via the first communication module. In an embodiment, Counter and VUpper may be received by the first communication module via a second communication module, a second applet, and the first applet from the second electronic device via the second communication module in UWB out-of-band.

Referring to option 4, the first applet of the first electronic device may generate and transmit StsKey and VUpper to the first communication module. In an embodiment, Counter may be received by the first communication module from the second electronic device in UWB in-band via the first communication module. In an embodiment, Counter may be received by the first communication module via the second communication module, the second applet, and the first applet from the second electronic device via the second communication module in UWB out-of-band.

Figure 14:
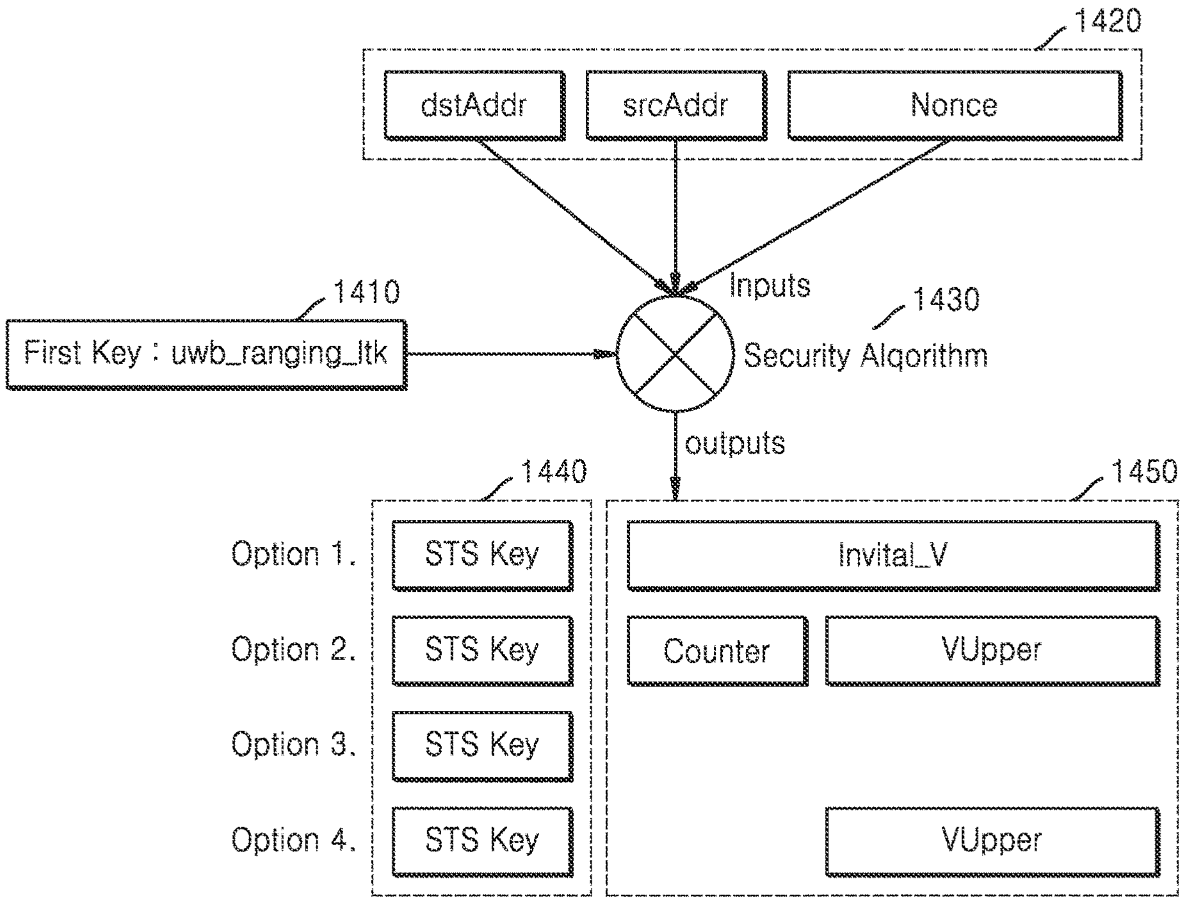
FIG. 14 is a view for describing scenarios of input values for generating an STS.

FIG. 14 is a view for describing scenarios of input values for generating an STS.

As described above in FIGS. 10, 11A, 11B, and 12, additional information 1420 may include the identification information srcAddr of the first electronic device, the identification information srcAddr of the second electronic device, and a nonce. The nonce may include at least one of a nonce generated by the first electronic device, a nonce generated by the second electronic device, a nonce generated by a security element of the first electronic device, or a nonce generated by a security element of the second electronic device.

In an embodiment, the identification information srcAddr of the first electronic device and the identification information srcAddr of the second electronic device may be used as input values for generating a StsKey 1440. Furthermore, the nonce dstNonce generated by the second electronic device may be used as an input value, the nonces srcNonce and dstNonce generated by the first electronic device and the second electronic device may be used as input values, the nonce dkNonce generated by the security element of the first electronic device may be used as an input value, the nonce srcNonce generated by the first electronic device may be used as an input value, or a nonce generated by the security element of the second electronic device may be used as an input value.

According to an embodiment of the disclosure, a first key generated in the first electronic device and a second key generated in the second electronic device may have independent values as asymmetric keys. The first key and the second key having the same value as the asymmetric keys may be referred to as long term keys. Embodiments of the disclosure in which the first key and the second key have independent values as asymmetric keys will be described with reference to FIGS. 15 and 16.

Figure 15:
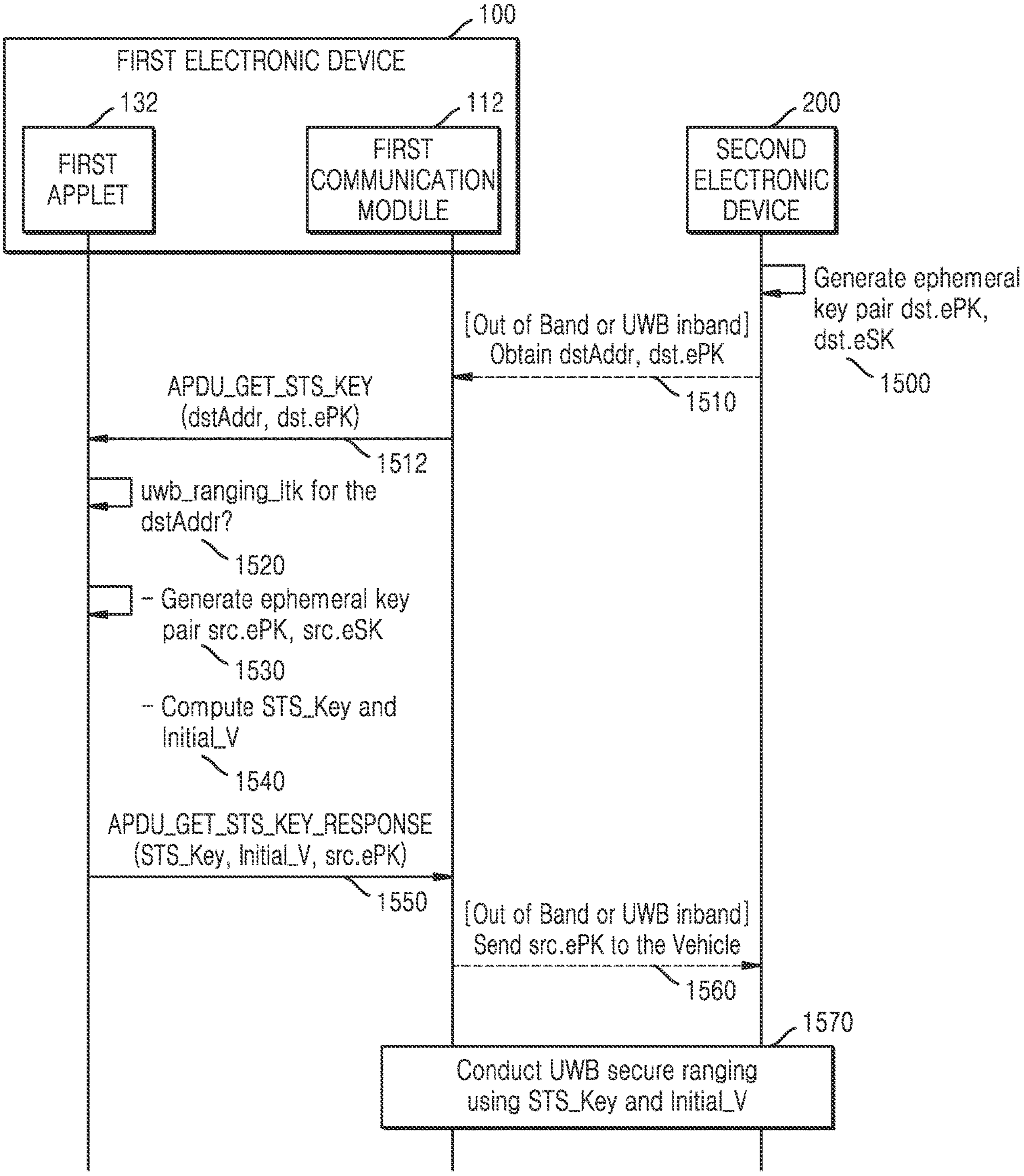
FIG. 15 is a flowchart of a method of generating an STS by using an asymmetric key in a first electronic device and a second electronic device.

FIG. 15 is a flowchart of a method of generating an STS by using an asymmetric key in a first electronic device and a second electronic device.

In operation 1500, the second electronic device 200 may generate an ephemeral key pair (dst.ePK and dst.eSK).

In operation 1510, the second electronic device 200 may transmit the identification information dstAddr and the ephemeral public key dst.ePK of the second electronic device 200 to the first electronic device 100, and the first electronic device 100 may receive the identification information dstAddr and the ephemeral public key dst.ePK of the second electronic device 200 in UWB inband through the first communication module 112 or in UWB out-of-band via the second communication module 114. The information received through the first communication module 112 may be directly transmitted to the first applet 132, and information received via the second communication module 114 may be transmitted to the first applet 132 via the second applet 134.

In operation 1512, the first communication module 112 may transmit the identification information dstAddr and the ephemeral public key dst.ePK of the second electronic device 200 to the first applet 132, and may request the first applet 132 to generate a StsKey to be used to perform UWB security ranging with the second electronic device 200. In operation 1512, the "GET_STS_KEY" command may be used.

In operation 1520, the first applet 132 may verify whether a valid first key corresponding to the identification information dstAddr of the second electronic device 200 is stored. When a valid first key corresponding to the identification information dstAddr of the second electronic device 200 is not stored, an error may be returned and the process may be stopped.

In operation 1500, the second electronic device 200 may generate the ephemeral key pair (dst.ePK and dst.eSK).

In operation 1540, the first applet 132 may generate a first key by using all of a static secret key src.SK and the ephemeral secret key src.eSK of the first applet 132, and a static public key dst.PK and the ephemeral public key dst.ePK of the second electronic device. Furthermore, the first applet 132 may generate StsKey and Initial_V based on the generated first key.

In operation 1550, the first applet 132 may send the generated StsKey, Initial_V, and the ephemeral public key src.ePK thereof to the first communication module 112. In operation 1550, the "GET STS KEY" response may be used.

In operation 1560, the ephemeral public key src.ePK of the first electronic device 100 may be sent to the second electronic device 200 in UWB inband through the first communication module 112 or in UWB out-of-band via the second communication module 114.

In operation 1570, the first communication module 112 may generate an STS based on the received StsKey and Initial_V.

In an embodiment, the first communication module 112 may obtain Counter and VUpper from Initial_V. According to an embodiment of the disclosure, a portion of Initial_V may be set to Counter, and the remaining may be set to VUpper. For example, the first 32 bits of Initial_V may be set to Counter and the latter 96 bits may be set to VUpper, but are not limited thereto. The rule for obtaining Counter and VUpper from Initial_V may be known to the first electronic device 100 and the second electronic device 200 in advance.

According to an embodiment of the disclosure, because the first key and the second key, which are STS generation factors, are asymmetric, security of communication between the first electronic device 100 and the second electronic device 200 may be further enhanced.

Figure 16:
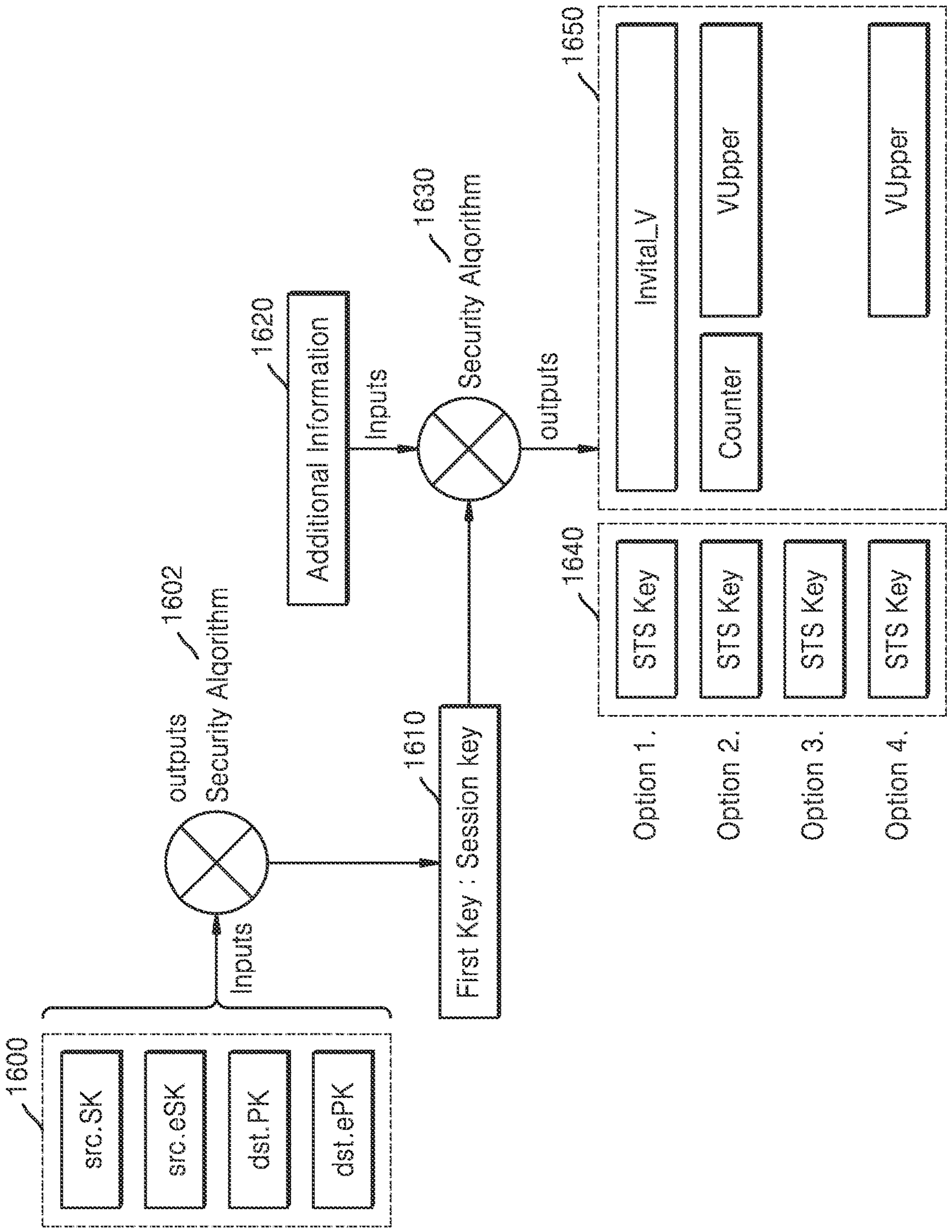
FIG. 16 is a view for describing a method of generating an STS by using an asymmetric key.

FIG. 16 is a view for describing a method of generating an STS by using an asymmetric key.

Referring to FIG. 16, the first applet of the first electronic device may generate a first session key by using all of the static secret key src.SK and the ephemeral secret key src.eSK of the first electronic device, and the static public key dst.PK and the ephemeral public key dst.ePK of the second electronic device. At this time, the first session key may be generated by using an elliptic curve key agreement algorithm (ECKA).

The first applet of the first electronic device may generate a StsKey 1640 based on a first session key 1610 and additional information 1620. In an embodiment, the first session key 1610 may be used as a key value of a security algorithm, for example, a CMAC algorithm using AES-128, and the additional information 1620 may be input as input values for a corresponding security algorithm 1630.

In an embodiment, the additional information 1620 may include the identification information srcAddr of the first electronic device and the identification information srcAddr of the second electronic device.

Values in operations 1640 and 1650 of FIG. 16 illustrate values that may be transmitted from the first applet to a first communication module. Scenarios according to options 1, 2, 3, and 4 are substantially the same as scenarios of FIG. 13, and thus duplicate description is omitted.

According to an embodiment of the disclosure, in order for the first applet of the first electronic device and the first communication module to communicate with each other, the first communication module may select the first applet. In order for the first communication module to select the first applet, a "SELECT" command may be used.

Exemplary commands necessary to implement the above embodiments of the disclosure will be described.

The commands described below may be used by a second applet (service applet or Digital Key Applet; DK Applet) in a UWB digital key system. For example, application protocol data unit (APDU) commands shown in Table 1 may be used.

TABLE 1

| Command | Wired Interface | Contactless Interface | Comment |
|---|---|---|---|
| SELECT | Yes | Yes | Updated from CCC Digital Key Phase 2 |
| SET RANGING KEY | No | Yes | |
| CONFIRM RANGING KEY | No | Yes | |

Here, the wired interface is an interface between the security element SE and an application process AP. The contactless interface is an interface in which the SE is connected to an NFC reader via NFC. SIO is an interface used within the SE to exchange information between applets and applets. For example, the SIO may be an interface used for exchanging information between the first applet and the second applet of the first electronic device.

In order for the first applet and the second applet, for example, a DK applet and a UWB applet, to communicate with each other, the following SIO function may be used.

. . . SIO_set_ranging_key

. . . SIO_delete_ranging_key

. . . SIO_confirm_ranging_key

The "SELECT" command may be used to select an applet to be used for communication. An instance_AID parameter used in the "SELECT" command may be determined at the step of installing the applet. Table 2 relates to a "SELECT" response field.

command: 00 A4 04 00 Lc [instance_AID] 00 response: [Table 2] 90 00

TABLE 2

| Tag | Length | Description | Field is |
|---|---|---|---|
| $5C_h$ | variable | This field is a list of supported protocol versions ordered from highest to lowest, each version number is concatenated and encoded on 2 bytes in big endian notation. $0100_h$: protocol version defined in CCC Digital Key Phase 2 $0200_h$: UWB Digital Key (Secure ranging available) | mandatory |

In a UWB digital key system, the protocol version (protocol_version) is preferably set to $0200_h$.

Through the "SET RANGING KEY" command, another electronic device, for example, an automobile, initiates UWB pairing. The "SET RANGING KEY" command may send a vehicle's ephemeral public key (ephemeral PK) and a vehicle address to the DK applet. The "SET RANGING KEY" command and a response thereto may be sent only through a secure channel Table 3 relates to a "SET RANGING KEY" command decrypted payload, and Table 4 relates to a "SET RANGING KEY" response decrypted payload.

command: 84 90 00 00 Lc [encrypted_command_payload] [command_mac] 00 response: [encrypted_response_payload] [response_mac] 90 00

TABLE 3

| Tag | Length | Description | Field is |
|---|---|---|---|
| $4C_h$ | 16 | transaction_identifier | mandatory |
| $64_h$ | variable | dstAddr, 2 or 8 byte UWB mac address of the vehicle | mandatory |
| $87_h$ | 65 | dst.ePK, ephemeral public key of the vehicle to establish shared long term key for UWB security ranging | mandatory |

TABLE 4

| Tag | Length | Description | Field is |
|---|---|---|---|
| $64_h$ | variable | srcAddr, 2 or 8 byte UWB mac address of the DK device | mandatory |
| $87_h$ | 65 | src.ePK, public key of the DK device to establish shared long term key for UWB security ranging | mandatory |
| $9D_h$ | 16 | srcCryptogram, computed by the UWB applet | mandatory |

Processing rules of the "SET RANGING KEY" command are as follows:

When this command has not been received via a secure channel, the DK applet returns an error.

The DK applet sends dstAddr and dst.ePK to the UWB applet by using an SIO function defined in section 3.5.1.

The DK applet obtains srcAddr, src.ePK, and srcCrpytogram from the UWB applet.

The DK applet stores dstAddr information in association with the currently active digital key information.

The DK applet responds to the vehicle with a SET RANGING KEY response, including data of Table 9-4.

The "CONFIRM RANGING KEY" command may be used to confirm that another electronic device has the same key (uwb_ranging_ltk) as that of the electronic device. The "CONFIRM RANGING KEY" command and a response thereto may be sent only through a secure channel Table 5 relates to a "CONFIRM RANGING KEY" command decrypted payload.

command: 84 92 00 00 Lc [encrypted_command_payload] [command_mac] 00 response: 90 00

TABLE 5

| Tag | Length | Description | Field is |
|---|---|---|---|
| $4C_h$ | 16 | transaction__identifier | mandatory |
| $64_h$ | variable | dstAddr, 2 or 8 byte UWB mac address of the vehicle | mandatory |
| $9D_h$ | 16 | dstCryptogram, computed by the vehicle | mandatory |

Processing rules of the "CONFIRM RANGING KEY" command are as follows:

When this command has not been received via the secure channel, the DK applet returns an error.

The DK applet requests the UWB applet to verify dstCryptogram. The DK applet receives dstCryptogram verification results.

When the dstCryptogram has been successfully verified, the DK applet responds to the vehicle with 90 00 in the "CONFIRM RANGING KEY" response.

When verification fails, the DK applet responds to the vehicle with error code.

The UWB applet computes a long term key for UWB secure ranging during UWB pairing. Also, STS_Key and Initial_V are computed at the request of a UWB chipset.

The commands described below may be used by a first applet (UWB applet) in a UWB digital key system. For example, the APDU commands shown in Table 6 may be used.

TABLE 6

| Command | Wired Interface | UWB Interface | Comment |
|---|---|---|---|
| SELECT | Yes | Yes | |
| GET STS KEY | No | Yes | |

Here, the wired interface is an interface between the security element SE and the application process AP. A UWB interface is an interface between the SE and a UWB module (UWB chipset). The SIO is an interface used within the SE to exchange information between applets and applets. For example, the SIO may be an interface used for exchanging information between the first applet and the second applet of the first electronic device.

In order for the second applet and the first applet, for example, the UWB applet and the DK applet, to communicate with each other, the following SIO function may be used.

. . . SIO_set_ranging_key

. . . SIO_delete_ranging_key

. . . SIO_confirm_ranging_key

The "SELECT" command may be used to select an applet to be used for communication. An instance_AID parameter used in the "SELECT" command may be determined at the step of installing the applet. Table 2 relates to a "SELECT" response field.

command: 00 A4 04 00 Lc [instance_AID] 00 response: [Table 7] 90 00

TABLE 7

| Tag | Length | Description | Field is |
|---|---|---|---|
| $5C_h$ | 2 | protocol__version, the supported protocol version of the UWB applet<br>$0100_h$: protocol version defined in UWB digital key specification | mandatory |

A "GET STS KEY" command may cause the UWB module (UWB chipset) to obtain an STS key and initial values to be used for UWB secure ranging from the UWB applet. The "GET STS KEY" command and a response thereto may be sent only through a secure channel Table 8 relates to a "GET STS KEY" command payload, and Table 9 relates to a "GET STS KEY" response payload.

command: 84 94 00 00 Lc [Table 8] 00 response: [encrypted_payload][mac] 90 00

TABLE 8

| Tag | Length | Description | Field is |
|---|---|---|---|
| $64_h$ | variable | dstAddr, 2 or 8 byte UWB mac address of the destination (i.e. vehicle) | mandatory |
| $91_h$ | 16 | dstNonce, 128 bit random value chosen by the UWB destination device (i.e. vehicle) | mandatory |

TABLE 9

| Tag | Length | Description | Field is |
|---|---|---|---|
| $XX_h$ | 16 | STS__Key, 128-bit key calculated by using fields from Table 8 and long term key (uwb__ranging__ltk) | mandatory |
| $XX_h$ | 16 | Initial__V, 128-bit initial value calculated by using fields from Table 8 and long term key (uwb__ranging__ltk) | mandatory |
| $91_h$ | 16 | srcNonce, 128-bit random value chosen by UWB applet | mandatory |

Processing rules of the "GET STS KEY" command are as follows:

When this command has not been received via the secure channel, the DK applet returns an error.

The UWB applet verifies whether dstAdr has a valid long term key.

When there is no valid long term key, the UWB applet returns an error.

The UWB applet generates random nonce (random srcNonce).

The UWB applet generates STS_Key according to the following 5.STS_Key and Initial_V generation algorithm by using a long term key.

The UWB applet generates Initial_V according to the following 5.STS_Key and Initial_V generation algorithm by using a long term key.

The UWB applet responds to the UWB module with GET STS KEY

Applets inside the security element SE may exchange information by using sharable interface objects (SIO) provided by a Java card system.

"SIO_set_ranging_key" will be described.

Function provider: UWB applet

Expected Function Caller: DK applet

Input: MAC address of destination device (dstAddr), public key of destination device (dst.ePK), and service requester AID Output: MAC address of source device (srcAddr), public key of source device (src.ePK), and srcCryptogram Processing rules of the "SIO_set_ranging_key" are as follows:

The UWB applet examines the validity of input values.

The UWB applet computes the long term key (uwb_ranging_ltk) as follows:

Generate ephemeral key pair src. ePK and src.eSK (1. Generated according to algorithm that generates key pair)

. . . Calculate Kdh by using dst.ePK and src.eSK (2. Calculated according to algorithm that computes Diffie-Hellman shared key)

Set Kdh's most significant bytes to Kc and least significant bytes to long-term key (uwb_ranging_ltk)

The UWB applet computes srcCryptogram as follows.

Calculate KCsmac with Kc as key (3. Calculated according to algorithm that derives KCsmac and KCdmac)

Calculate srcCryptogram with KCsmac as key (4. Calculated according to algorithm that computes message authentication code (cryptogram) for UWB ranging key)

The UWB applet returns srcAddr, src.ePK, and srcCryptogram.

"SIO_delete_ranging_key" will be described below.

Function provider: UWB applet

Expected function caller: Digital Key applet

Input: MAC address of destination device (dstAddr) or "all", and service requester AID Output: result Processing rules of the "SIO_delete_ranging_key" is as follows:

The UWB applet examines the validity of input values.

When a specific dstAddr is received as an input value, the UWB applet deletes all information associated with the dstAddr.

When "all" is input, all UWB ranging long term keys generated by the request of the DK applet that called the SIO function are deleted.

The UWB applet returns deletion results.

"SIO_confirm_ranging_key" will be described below.

Function provider: UWB applet

Expected function caller: Digital Key applet input: Mac address of destination device (dstAddr), dstCryptogram output: result Processing rules of the "SIO_confirm_ranging_key" are as follows:

The UWB applet examines the validity of input values.

The UWB applet verifies dstCryptogram as follows.

Calculate KCdmac with Kc as key (3. Calculated according to algorithm that derives KCsmac and KCdmac)

Validate dstCryptogram with KCdmac as key (4. Calculated according to algorithm that computes the message authentication code (cryptogram) for UWB ranging key)

The UWB applet returns a verification result.

The following describes algorithms used in the embodiments of the disclosure.

1. The algorithm for generating a key pair is as follows:

```
input: none
output: ecc.PK.x, ecc.PK.y, ecc.PK, ecc.SK
begin
  set curve parameters ← 'ECC NIST P-256' as per [3]
  generate ecc.PK.x, ecc.PK.y, ecc.SK
  ecc.PK = (ecc.PK.x, ecc.PK.y)
  return ecc.PK.x (32 Bytes), ecc.PK.y (32 Bytes), ecc.SK (32 Bytes)
end
```

2. The algorithm for computing a Diffie-Hellman shared key is as follows:

```
input: ePK, eSK, (transaction_identifier)
output: Kdh
begin
  Compute the steps indicated by BSI TR-03111 1 section 4.3 with the following mapping:
  KeyAgreementProtocol : ECKA-DH
  (p, a, b, G, n, h) : ECC NIST P-256 Curve parameters as per 1
  d̂ : eSK
  P̂: ePK
  S_AB : key agreement output (shared secret point)
  Z_AB : computed from S_AB as per BSI TR-03111 1 section 3.1.3
  key derivation input : Z_AB
  K : 256
  H : SHA-256
  SharedInfo : (transaction_identifier)
  KeyData : Kdh (32 Bytes)
end
```

3. The algorithm for deriving KCsmac and KCdmac is as follows:

```
input: Kc, dst.PK.x, src.PK.x, dstAddr, srcAddr, derivation
output: KCsmac or KCdmac
Begin
  Compute the steps indicated by NIST SP800-108 [4] section 5.1 with the following mapping:
  PRF : CMAC as defined by NIST SP800-38B using AES-128 block cipher [5]
```

-continued

```
   h : 128
   r : 8
   Ki : Kc (16 Bytes)
   Label : 0000000000000000000000h || derivation (1 byte, 10h for smac, 12h for dmac)
   Context : dst.PK.x || src.PK.x || dstAddr || scrAddr || interface byte (6Ah for UWB)
   L : 0080h (AES-128)
   PRF(Ki, Label || 00h || L || 1 || Context) : concatenation order
   Ko : KCsmac or KCdmac (depending on derivation byte) (16 Bytes)
end
```

4. The algorithm for computing the message authentication code (cryptogram) for a UWB ranging key may be implemented as follows:

```
input: K, dst.PK.x, src.PK.x, dstAddr, srcAddr, derivation
output: srcCryptogram or dstCryptogram
begin
   Compute the steps indicated by NIST SP800-108 [4] section 5.1 with the following mapping:
   PRF : CMAC as defined by NIST SP800-38B using AES-128 block cipher [5]
   h : 128
   r : 8
   Ki : K
   Label : 0000000000000000000000h || derivation (1 byte, 14h for srcCryptogram, 16h for dstCryptogram)
   Context : dst.PK.x || src.PK.x || dstAddr || scrAddr
   L : 0080h (AES-128)
   PRF(Ki, Label || 00\hex || L || 1 || Context) : concatenation order
   Ko : srcCryptogram(16 Bytes) or dstCryptogram(16 Bytes) (depending on derivation bytes)
end
```

5. The algorithm for generating STS_Key and Initial_V may be implemented as follows:

```
input: uwb__ranging__ltk, dstAddr, srcAddr, dstNonce, srcNonce, derivation
output: STS__Key or Initial__V
begin
   Compute the steps indicated by NIST SP800-108 [4] section 5.1 with the following mapping:
   PRF : CMAC as defined by NIST SP800-38B using AES-128 block cipher [5]
   h : 128
   r : 8
   Ki : uwb__ranging__ltk (16 Bytes)
   Label : 0000000000000000000000h || derivation (1 byte, 18h for STS__Key, 1Ah for Initial__V)
   Context : dstAddr || srcAddr || dstNonce || srcNonce
   L : 0080h (AES-128)
   PRF(Ki, Label || 00h || L || 1 || Context) : concatenation order
   Ko : STS__Key or Initial__V (depending on derivation byte) (16 Bytes)
end
```

Methods according to embodiments of the disclosure described in the claims or specification of the disclosure may be implemented in the form of hardware, software, or a combination of hardware and software.

When implementing the methods in software, a non-transitory computer-readable storage medium storing one or more programs (software modules) may be provided. The one or more programs stored on the non-transitory computer-readable storage medium are configured to be executable by one or more processors in an electronic device. The one or more programs may include instructions that cause the electronic device to execute the methods according to the embodiments of the disclosure described in the claims or the specification of the disclosure.

These programs (software modules or software) may be stored in random access memory, non-volatile memory including flash memory, Read Only Memory (ROM), Electrically Erasable Programmable Read Only Memory (EEPROM), a magnetic disc storage device, compact disc ROM (CD-ROM), digital versatile discs (DVDs) or other types of optical storage devices, or magnetic cassettes. Alternatively, these programs may be stored in a memory composed of some or all of these combinations. Also, each of the programs may include a plurality of configuration memories.

Further, the program may be stored in a communication network such as the Internet, the Intranet, local area network (LAN), wide LAN (WLAN), or storage area network (SAN), or an attachable storage device accessible through a communication network composed of a combination of them. Such a storage device may access a device performing an embodiment of the disclosure through an external port. In addition, a separate storage device on the communication network may access a device that performs the embodiment of the disclosure.

Meanwhile, in the detailed description of the disclosure, specific embodiments of the disclosure have been described, but various modifications are possible without departing from the scope of the disclosure. Therefore, the scope of the disclosure should be defined not by the described embodiments of the disclosure alone, but by the appended claims and the equivalents thereof.

The block diagrams disclosed in the disclosure may be interpreted by one of ordinary skilled in the art as conceptual representations of circuits for implementing the principles of the disclosure. Similarly, any flow chart, state transition diagram, pseudo code, etc. are substantially represented in a non-transitory computer-readable recording medium. Therefore, it will be appreciated by one of ordinary skill in the art that a computer or processor represents various processes that can be executed by the computer or processor, whether or not the computer or processor is explicitly shown. As a result, the embodiments of the disclosure may be written as computer programs and can be implemented in general-use digital computers that execute the programs by using a non-transitory computer-readable recording medium. The non-transitory computer-readable recording medium may be a magnetic storage medium (e.g., ROM, a floppy disk, a hard disk, etc.), or an optical reading medium (e.g., CD-ROM, a DVD, or the like).

Functions of various elements shown in the figures may be provided through the use of dedicated hardware as well as hardware capable of executing software in connection with appropriate software. When a function is provided by a processor, the function may be provided by a single dedicated processor, a single shared processor, or a plurality of individual processors, some of which may be shared. In addition, the explicit use of the term "processor" or "controller" should not be construed as exclusively referring to hardware capable of executing software, and the term may include, without limitation and implicitly, digital signal processor (DSP) hardware, and ROM, random access memory (RAM), and a nonvolatile storage for storing software.

In addition, a plurality of non-transitory computer-readable recording media may be distributed over network coupled computer systems, and data stored in the distributed recording media, for example program instructions and code, may be executed by at least one computer.

In the claims of this specification, an element expressed as a device for performing a specific function encompasses any manner of performing the specific function, and the element may include combinations of circuit elements that perform the specific function, or any form of software, including firmware, microcode, etc., combined with a suitable circuit to perform software to perform the specific function.

In this specification, reference to the 'an embodiment of the disclosure' of the principles of the disclosure and various modifications of this expression mean that a specific feature, structure, characteristic, etc. in connection with this embodiment of the disclosure is included in at least one embodiment of the disclosure of the principles of the disclosure. Thus, the expression 'In an embodiment' and any other modifications disclosed throughout this specification are not necessarily all referring to the same embodiment of the disclosure.

In this specification, the expression of 'at least one of ~' in the case of 'at least one of A or B' is used to encompass only the selection of the first option A, or only the selection of the second option B, or the selection of both options A and B. As a further example, the expression 'at least one of A, B, or C' encompasses only the selection of the first option A, or only the selection of the second option B, or only the selection of the third option C, or only the first and second options A and B, or only the selection of the second and third options B and C, or the selection of all three options A, B and C. Even when more items are listed, it can be clearly interpreted to one of ordinary skill in the art.

The disclosure has been described above with reference to preferred embodiments of the disclosure thereof.

All embodiments of the disclosure and conditional examples disclosed through this specification are described by one of ordinary skill in the art to help readers understand the principles and concepts of the disclosure, and one of ordinary skill in the art will understand that the disclosure may be implemented in a modified form without departing from the essential characteristics of the disclosure. It should be understood that embodiments of the disclosure described herein should be considered in a descriptive sense only and not for purposes of limitation. The scope of the disclosure is indicated in the claims rather than the above description, and all differences within the scope of equivalents should be construed as being included in the scope of the disclosure.

The invention claimed is:

1. A method, performed by a first electronic device, of wireless communicating with a second electronic device using a first communication protocol, the method comprising:

receiving, from the second electronic device, a public key of the second electronic device using a second communication protocol;

generating a first key based on a secret key of the first electronic device and the public key of the second electronic device;

transmitting a public key of the first electronic device to the second electronic device;

generating three parameters based on the first key and an additional information, wherein the three parameters include STSkey (phyHarpUwbStsKey), Vupper (phyHrpUwbStsVUpper96) and counter ((phyHrpUwbStsVCounter);

generating a scrambled timestamp sequence (STS) based on the three parameters; and communicating with the second electronic device through the first communication protocol by using the STS, wherein the first communication protocol is independent of the second communication protocol, and wherein the additional information includes at least one of identification information of the first electronic device, a nonce generated by the first electronic device, and a nonce generated by a security element of the first electronic device.

2. The method of claim 1, wherein the first communication protocol is ultra-wide band (UWB) communication.

3. The method of claim 1, wherein the public key and the secret key of the first electronic device are ephemeral keys.

4. The method of claim 1, wherein the first key corresponds to identification information of the second electronic device in addition to the secret key of the first electronic device and the public key of the second electronic device, wherein the identification information of the second electronic device includes a media access control, MAC, address of the second electronic device.

5. The method of claim 1, wherein the first key is generated by a security element of the first electronic device and stored in the security element, wherein the first key is generated by a first applet of the security element and stored in the first applet, and wherein the public key of the second electronic device is received through the second communication protocol by a second applet different from the first applet of the first electronic device and transmitted to the first applet.

6. The method of claim 1, wherein the generating of the first key comprises:

generating a Diffie-Hellman key based on the secret key of the first electronic device and the public key of the second electronic device; and generating the first key based on the Diffie-Hellman key, wherein the first key comprises a portion of the Diffie-Hellman key, and wherein the method further comprises:

generating message authentication code of the first electronic device based on a signature key including a rest portion of the Diffie-Hellman key excluding the portion, transmitting the message authentication code to the second electronic device, and verifying, based on the signature key, a message authentication code of the first electronic device received from the second electronic device.

7. The method of claim 1, wherein the generating of the STS comprises:

generating a timestamp sequence key based on the first key and the additional information;

obtaining at least two factors; and generating the STS based on the timestamp sequence key and the at least two factors, wherein the sum of lengths of the at least two factors is equal to a length of the timestamp sequence key.

8. The method of claim 7, wherein at least one of the at least two factors is generated by the first electronic device based on the first key.

9. The method of claim 7, wherein at least one of the at least two factors is received from the second electronic device.

10. The method of claim 1, wherein the first key and the second key are asymmetric keys, and the generating of the first key comprises generating the first key based on the secret key and an ephemeral secret key of the first electronic device and the public key and an ephemeral public key of the second electronic device.

11. A first electronic device that communicates wireless with a second electronic device using a first communication protocol, the first electronic device comprising:

at least one communicator;

at least one memory storing instructions; and at least one processor configured to execute the instructions to:

receive, from the second electronic device, a public key of the second electronic device through the second communication, generate a first key based on a secret key of the first electronic device and the public key of the second electronic device, transmit a public key of the first electronic device to the second electronic device, generate three parameters based on the first key and an additional information, wherein the three parameters include STSkey (phyHarpUwbStsKey), Vupper (phyHrpUwbStsVUpper96) and counter ((phyHrpUwbStsVCounter), generate a scrambled timestamp sequence (STS) based on the three parameters, and communicate with the second electronic device through the first communication protocol by using the STS, wherein the first communication protocol is independent of the second communication protocol, and wherein the additional information includes at least one of identification information of the first electronic device, a nonce generated by the first electronic device, and a nonce generated by a security element of the first electronic device.

* * * * *